(12) United States Patent
Varma et al.

(10) Patent No.: US 10,831,959 B2
(45) Date of Patent: Nov. 10, 2020

(54) EMBEDDED FPGA TIMING SIGN-OFF

(71) Applicant: Achronix Semiconductor Corporation, Santa Clara, CA (US)

(72) Inventors: Namit Varma, Karnataka (IN); Shirish Jawale, San Jose, CA (US)

(73) Assignee: Achronix Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 16/363,434

(22) Filed: Mar. 25, 2019

(65) Prior Publication Data
US 2020/0311219 A1 Oct. 1, 2020

(51) Int. Cl.
G06F 30/30 (2020.01)
G06F 30/3312 (2020.01)
G06F 30/394 (2020.01)
G06F 119/12 (2020.01)

(52) U.S. Cl.
CPC ........ G06F 30/3312 (2020.01); G06F 30/394 (2020.01); *G06F 2119/12* (2020.01)

(58) Field of Classification Search
CPC ........................... G06F 30/394; G06F 30/3312
USPC .......................................... 716/108, 113, 134
See application file for complete search history.

(56) References Cited

U.S. PATENT DOCUMENTS

| | | | | |
|---|---|---|---|---|
| 5,541,849 A * | 7/1996 | Rostoker et al. | ............................ | G01R 31/31704 716/102 |
| 5,553,002 A * | 9/1996 | Dangelo et al. | ............................ | G01R 31/31704 716/102 |
| 5,555,201 A * | 9/1996 | Dangelo et al. | ............................ | G01R 31/31704 716/102 |
| 6,263,478 B1 * | 7/2001 | Hahn et al. | ......... | G06F 30/3312 716/113 |
| 6,553,557 B1 * | 4/2003 | Kataoka | ................ | G06F 30/327 716/103 |
| 7,823,112 B1 * | 10/2010 | Makarov et al. | ..... | G06F 30/327 716/129 |
| 8,056,038 B2 * | 11/2011 | Kalafala et al. | .... | G06F 30/3312 716/113 |
| 8,594,988 B1 * | 11/2013 | Spyrou et al. | ...... | G06F 30/3312 703/14 |
| 8,977,995 B1 * | 3/2015 | Arora et al. | .......... | G06F 30/327 716/105 |

(Continued)

*Primary Examiner* — Sun J Lin
(74) *Attorney, Agent, or Firm* — Schwegman Lundberg & Woessner, P.A.

(57) ABSTRACT

An advanced timing mode has a path that originates from a host application-specific integrated circuit (ASIC) and terminates at a register inside an embedded field programmable gate array (FPGA), bypassing interface cluster registers. The terminating register may be present at a boundary between the host ASIC and the embedded FPGA or deep inside the embedded FPGA. In a clock trunk input with internal divergence timing scenario, a clock output from a phase-locked loop (PLL) in the host ASIC is driven through a clock trunk into the embedded FPGA and, from there, diverges into interface cluster registers and the boundary adjacent to the host ASIC. A clock trunk input with external divergence timing scenario is similar to the internal divergence scenario except that a clock divergence occurs before the clock enters a clock trunk of the embedded FPGA. In a boundary clock input scenario, a PLL drives both the host ASIC and the embedded FPGA interface clusters.

20 Claims, 10 Drawing Sheets

(56) References Cited

U.S. PATENT DOCUMENTS

| 10,037,394 | B1 * | 7/2018 | Kulshreshtha et al. ..................... G06F 30/30 |
| 10,467,365 | B1 * | 11/2019 | Kulshreshtha et al. ..................... G06F 30/34 |
| 2001/0056568 | A1 * | 12/2001 | Hirotsu ................. G06F 30/327 716/108 |
| 2005/0177357 | A1 * | 8/2005 | Amatangelo et al. ....................... G06F 30/3312 703/16 |

* cited by examiner

EMBEDDED FPGA TIMING SIGN-OFF

BACKGROUND

An application-specific integrated circuit (ASIC) is a customized circuit built for a specific application. Many ASICs are designed by combining multiple discrete circuit designs. For example, an ASIC may make use of a new circuit design for a customized application in combination with an existing circuit design that performs common functions.

A field programmable gate array (FPGA) is a circuit that is customized after production. An ASIC may comprise an FPGA and be designed by combining a customized circuit design with an existing FPGA design.

Before an integrated design is fabricated, sign-off checks are performed. The sign-off checks test the integrated design to determine if the fabricated circuit will perform as expected. One of the sign-off checks is a static timing analysis. The static timing analysis verifies that all logic paths in the design operate as intended at the intended clock frequency.

One method of ensuring that the static timing analysis is successful is to add an interface cluster between a host ASIC and an integrated FPGA so that a register is used to hold each data value being transmitted between the designs. This method requires additional circuitry for the registers and adds delays for the setting and reading of the register values.

BRIEF DESCRIPTION OF THE DRAWINGS

Some embodiments of the disclosed technology are illustrated by way of example and not limitation in the figures of the accompanying drawings.

DETAILED DESCRIPTION

Example methods, systems and circuits for embedded FPGA sign-off will now be described. In the following description, numerous examples having example-specific details are set forth to provide an understanding of example embodiments. It will be evident, however, to one of ordinary skill in the art that these examples may be practiced without these example-specific details, and/or with different combinations of the details than are given here. Thus, specific embodiments are given for the purpose of simplified explanation, and not limitation.

An advanced timing mode has a path that originates from a host ASIC and terminates at a register inside an embedded FPGA, bypassing interface cluster registers. The terminating register may be present at the boundary between the host ASIC and the embedded FPGA or deep inside the embedded FPGA. The path may include logic elements. Such a path cannot be precisely modeled during the integrated ASIC timing sign-off because it depends on the place-and-route implementation of the particular design. Accordingly, this mode uses a timing budget to model delays during the static timing analysis.

In a clock trunk input with internal divergence timing scenario, a clock output from a phase-locked loop (PLL) in the host ASIC is driven through a clock trunk into the embedded FPGA and, from there, diverges into interface cluster registers and the ASIC boundary. As a result, the clock divergence point happens late in the clock tree. Thus, the divergent clock path is short and has a relatively small delay.

A clock trunk input with external divergence timing scenario is similar to the internal divergence scenario except that the clock divergence occurs before the clock enters the embedded FPGA trunk.

In a boundary clock input scenario, a PLL drives both the host ASIC and the embedded FPGA interface clusters. Each interface cluster drives logic in an associated logic cluster of the embedded FPGA. The PLL also drives a clock trunk of the embedded FPGA. This scenario allows the clock divergence point to occur late in the clock tree, reducing clock skew and on-chip variation impact. However, this scenario may result in boundary clock skews when a path is created between two registers from different boundary clock branches (e.g., the clock trunk and an interface cluster clock). Thus, the boundary constraints are taken into account when integrating the host ASIC with the embedded FPGA.

In each of these described scenarios, at least a portion of the interface registers required by prior art solutions are avoided, allowing the resulting ASIC to be smaller, consume less power, or perform operations more quickly.

Figure 1:
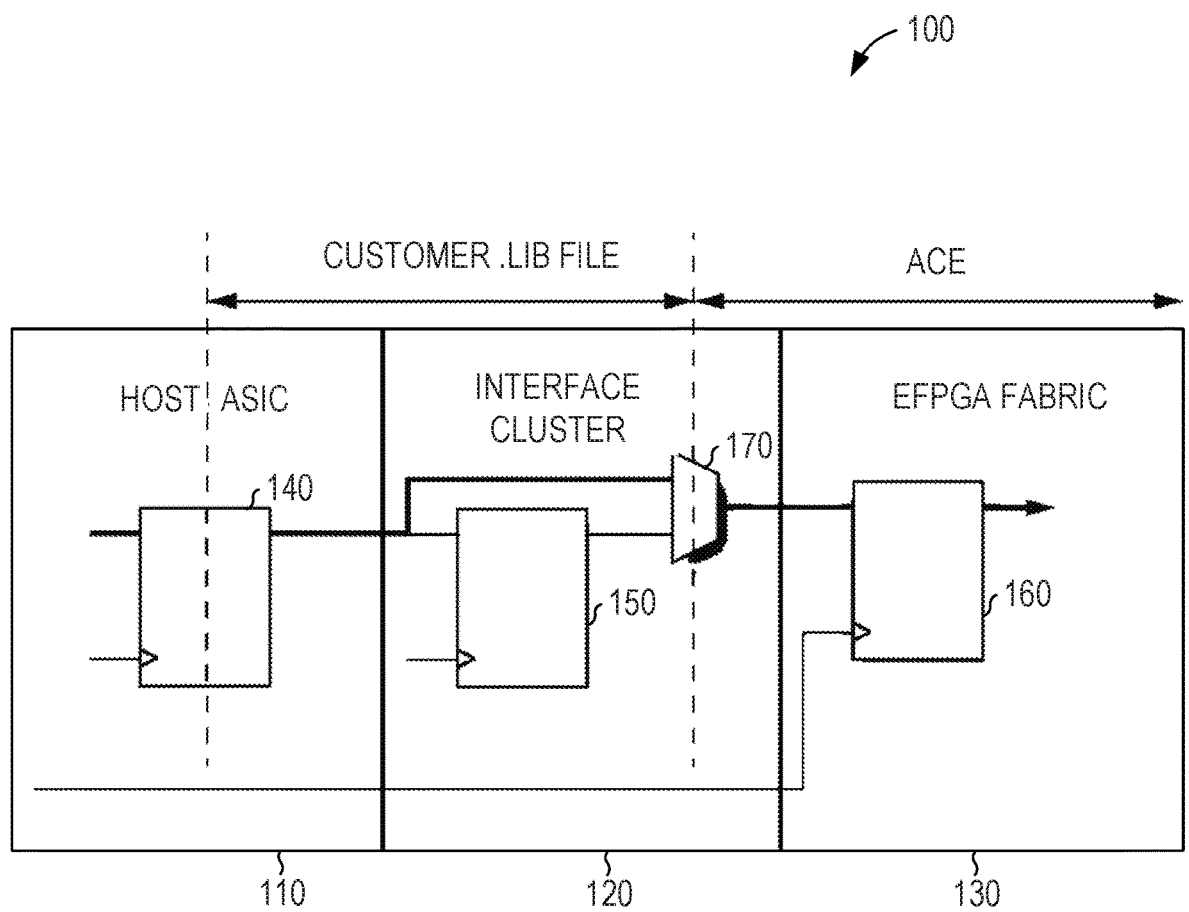
FIG. 1 is a high-level diagrammatic view of a timing mode, according to some example embodiments.

FIG. 1 is a high-level diagrammatic view of a timing mode 100, according to various embodiments of the invention. The timing mode 100 integrates a first circuit design, using an interface cluster 120, for a host ASIC 110, contained in a library (or .LIB) file with a second circuit design for an embedded FPGA 130 (also referred to as an FPGA fabric). The FPGA design is frequently made of repeated building blocks, such as lookup tables (LUTs), adders, and flip-flops.

The host ASIC includes a register 140. The embedded FPGA includes a register 160. The interface cluster 120 comprises a set of interface cluster registers and corresponding multiplexers. For clarity, only a single interface cluster register 150 and corresponding multiplexer 170 are shown. The interface cluster 120 allows data to be transferred between the host ASIC 110 and the embedded FPGA 130.

The multiplexer 170 allows selection between two data paths. In one data path, data is transferred directly from the register 140 to the register 160 without being retrieved from the register 150. This data path avoids delays intrinsic in storing and retrieving register data. However, if the path from the register 140 to the register 160 fails to meet timing constraints (e.g., is too long), the data received by the register 160 will not always be accurate and computation errors will result.

Using the other path of the multiplexer 170, the output from the register 140 is stored in the register 150 and the output from the register 150 is provided to the register 160. The register 150 is shown within the interface cluster, but may be inside the embedded FPGA 130, as permitted by the timing constraints. Though FIG. 1 shows direct connections between the registers 140, 150, and 160, logic elements may be present on the path between the registers, modifying the data and introducing delays.

The path to the register 160 through the multiplexer 170 cannot be precisely modeled during the ASIC timing sign-off because the timing of the path depends heavily on the place-and-route implementation of the integrated design comprising the first circuit design and the second circuit design. Accordingly, the integration software (e.g., Achronix ACE) uses a timing budget method to model delays. Though FIG. 1 shows a single register 150 in the interface cluster 120 for clarity, many such registers are generated in practical applications due to the complexity of both the host ASIC 110 and the embedded FPGA 130.

Figure 2:
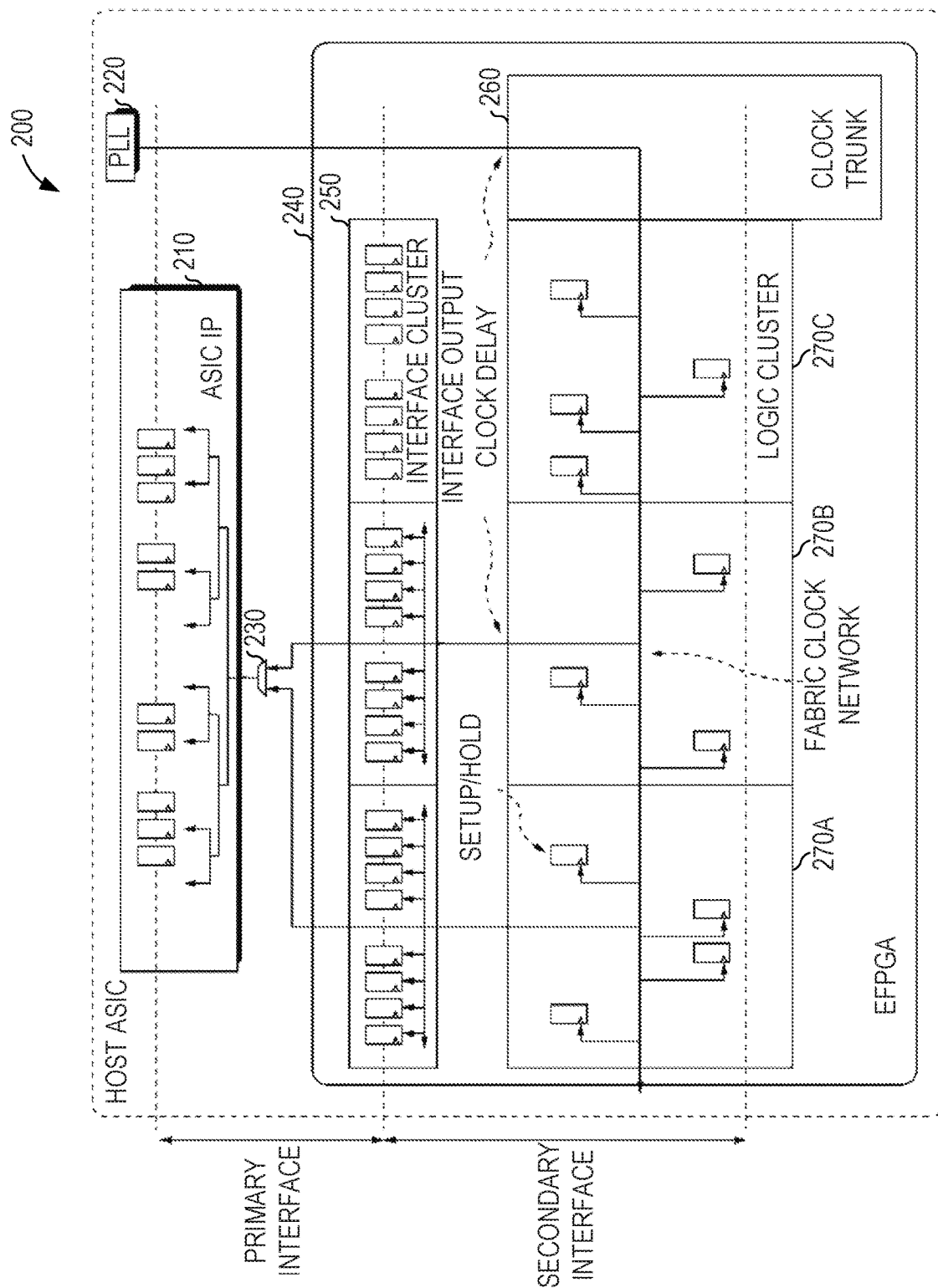
FIG. 2 is a diagrammatic view of a timing scenario using a clock trunk input with internal divergence, according to some example embodiments.

FIG. 2 is a diagrammatic view of a timing scenario 200 using a clock trunk input with internal divergence, according to some example embodiments. The timing scenario 200 is applied to an integrated circuit design comprising a host ASIC (a first circuit design) and an embedded FPGA (EFPGA) 240 (a second circuit design) connected via an interface cluster 250. The host ASIC comprises the ASIC design 210 (also referred to as the ASIC intellectual property (IP) 210) and a PLL 220. The EFPGA 240 comprises multiple logic clusters, such as logic clusters 270A, 270B, and 270C, and a clock trunk 260.

The PLL 220 generates a clock signal that is provided to the clock trunk 260. A clock signal is provided from the clock trunk 260 to the logic clusters 270A-270C. Clock signals are provided from the logic clusters 270A-270C to a multiplexer 230, bypassing the interface cluster 250.

Logic components of the EFPGA 240 are responsible for setting up and holding values in registers for access by the interface cluster 250. An interface output clock delay is measured as the delay between the time a clock signal is received by the clock trunk 260 from the PLL 220 and the time the corresponding clock signal is received by the interface cluster 250 from the FPGA fabric clock network.

The timing scenario 200 has the clock divergence point between the host ASIC and the EFPGA 240 late in the clock tree, causing the divergent clock path to be short with a relatively small delay. By comparison with prior art solutions with an earlier clock divergence point, delays are reduced, allowing for more efficient integrated circuits to be fabricated.

Figure 3:
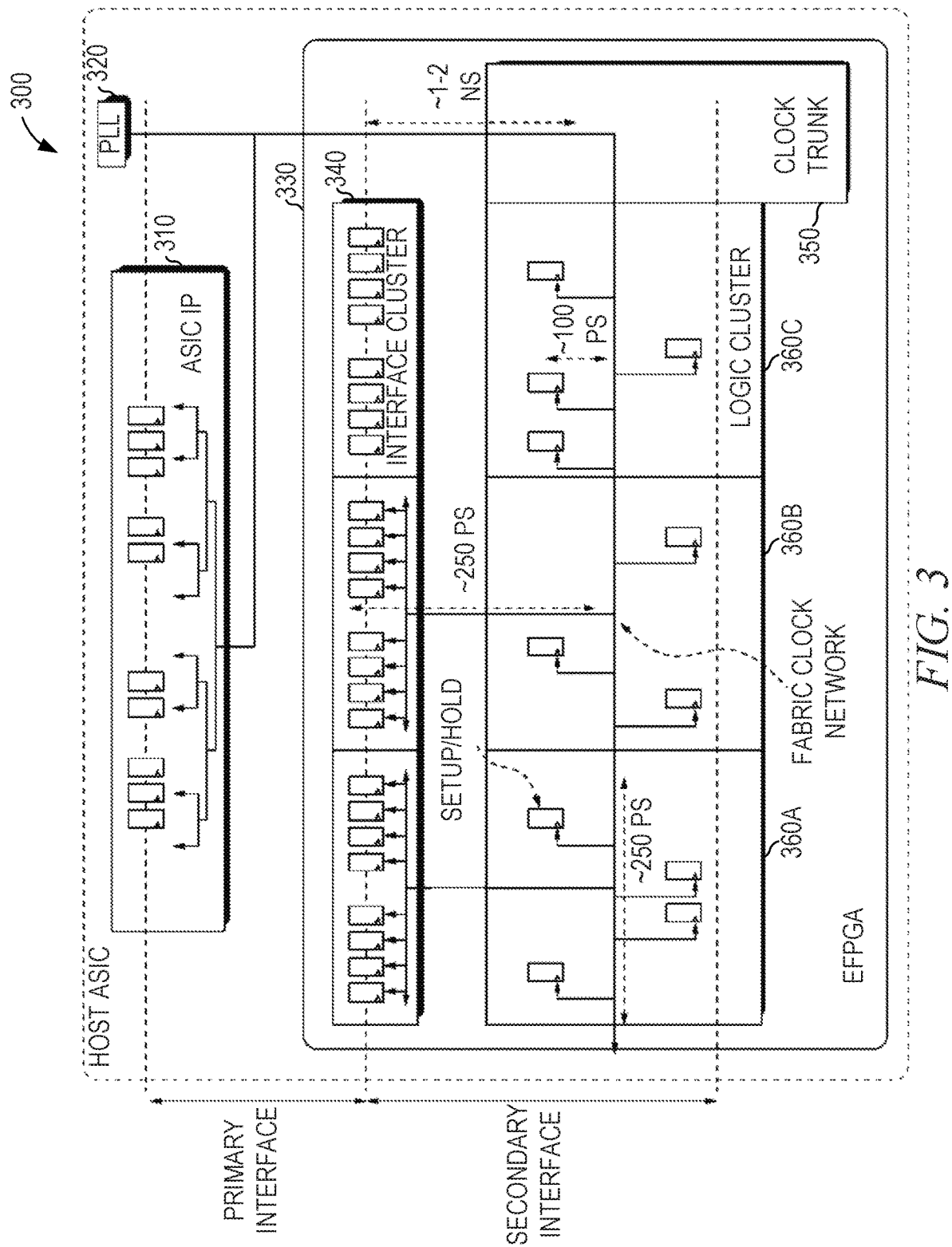
FIG. 3 is a diagrammatic view of a timing scenario using a clock trunk input with external divergence, according to some example embodiments.

FIG. 3 is a diagrammatic view of a timing scenario 300 using a clock trunk input with external divergence, according to some example embodiments. The timing scenario 300 is applied to an integrated circuit design comprising a host ASIC (a first circuit design) and an EFPGA 330 (a second circuit design) connected via an interface cluster 340. The host ASIC comprises the ASIC design 310 (also referred to as the ASIC IP 310) and a PLL 320. The EFPGA 330 comprises multiple logic clusters, such as logic clusters 360A, 360B, and 360C, and a clock trunk 350.

The PLL 320 generates a clock signal that is provided to the clock trunk 350 and the ASIC IP 310. A clock signal is provided from the clock trunk 350 to the logic clusters 360A-360C. Clock signals are provided from the logic clusters 360A-360C to corresponding portions of the interface cluster 340. By comparison with the timing scenario 200, the timing scenario 300 has the clock divergence much earlier in the clock tree.

The timing delay between the interface cluster 340 and the clock trunk 350 is on the order of 1-2 nanoseconds. The timing delay between a logic cluster and its corresponding interface is about 250 picoseconds. The timing delay across a single logic cluster is also about 250 picoseconds. The timing delay between a logic cluster clock and an output register of the same logic cluster is about 100 picoseconds.

Figure 4:
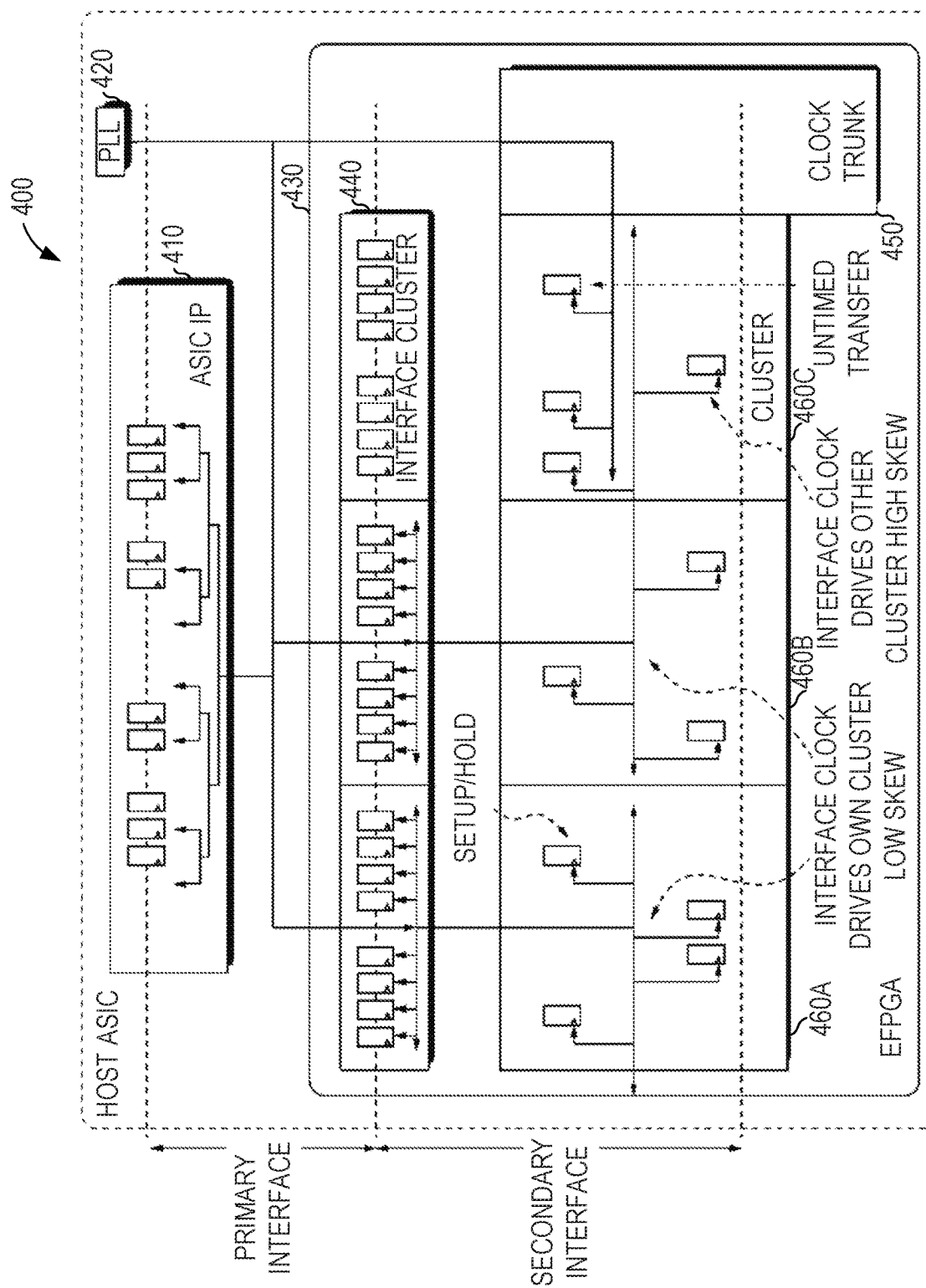
FIG. 4 is a diagrammatic view of a timing scenario using a boundary clock input, according to some example embodiments.

FIG. 4 is a diagrammatic view of a timing scenario 400 using a boundary clock input, according to some example embodiments. The timing scenario 400 is applied to an integrated circuit design comprising a host ASIC (a first circuit design) and an EFPGA 430 (a second circuit design) connected via an interface cluster 440. The host ASIC comprises the ASIC design 410 (also referred to as the ASIC IP 410) and a PLL 420. The EFPGA 430 comprises multiple logic clusters, such as logic clusters 460A, 460B, and 460C, and a clock trunk 450. The interface cluster 440 comprises one or more registers.

The PLL 420 generates a clock signal that is provided to the clock trunk 450, the ASIC IP 410, and the registers of the interface cluster 440. A clock signal is provided from the clock trunk 450 to the logic clusters 460A-460C. Clock signals are provided from the logic clusters 460A-460C to corresponding portions of the interface cluster 440. Thus, the interface cluster 440 has access to the clocks of both the logic clusters 460A-460C and the PLL 420. The timing scenario 400 may lead to clock crossing issues if there is a data path between two registers driven by different clock branches, possibly requiring synchronizing circuits.

The interface clock of each of the logic clusters 460A-460C can drive its own cluster and corresponding portion of the interface cluster with low skew. Additionally or alternatively, the interface clock of each of the logic clusters 460A-460C can drive its own cluster and corresponding portion of the interface cluster with high skew. Thus, in various embodiments, tradeoffs are made between having more interface clocks and lower skew with each clock or having fewer interface clocks and higher skew.

Figure 5:
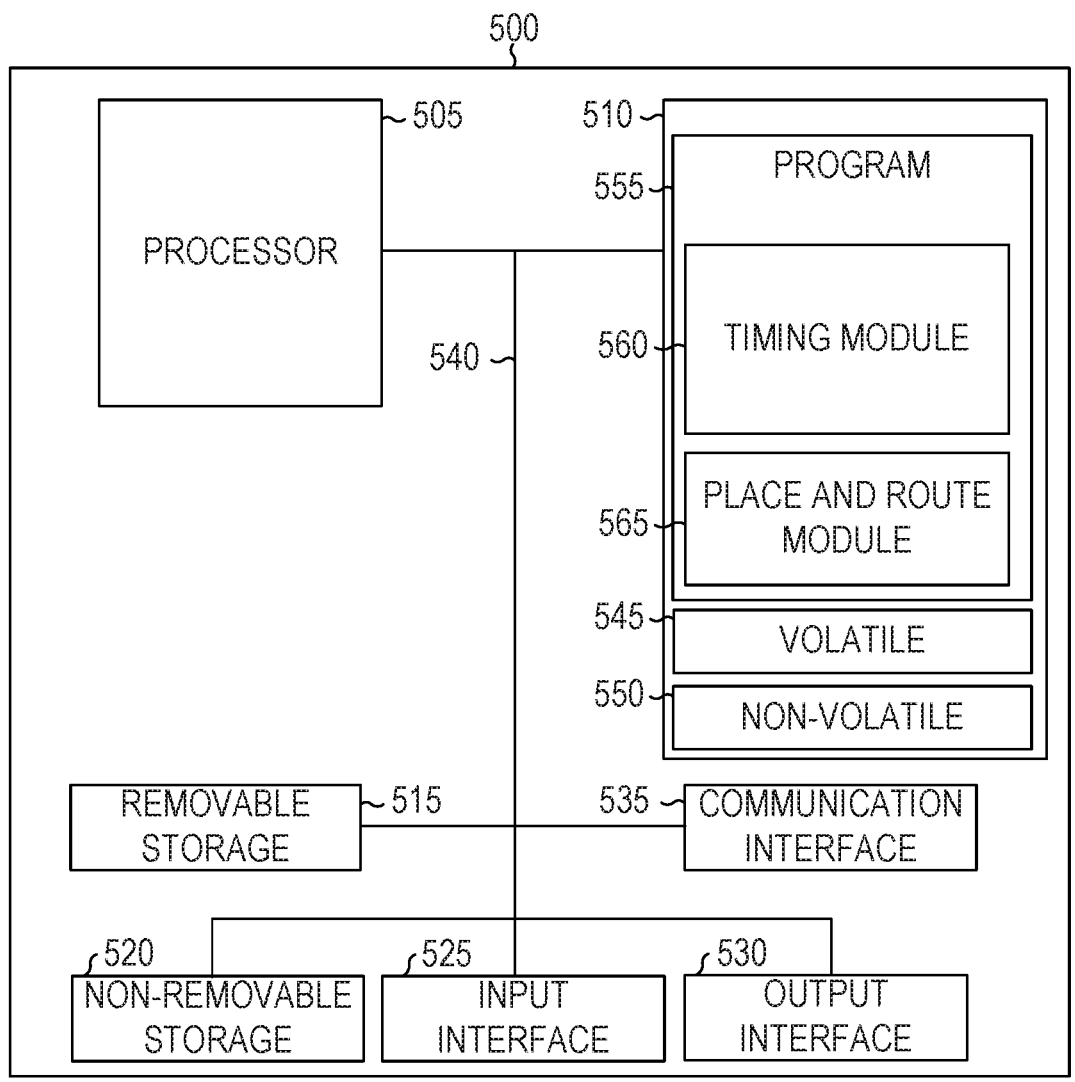
FIG. 5 is a block diagram illustrating components of a system for performing methods described herein, according to some example embodiments.

FIG. 5 is a block diagram illustrating components of a computer 500 that programs an FPGA, according to some example embodiments. All components need not be used in various embodiments. For example, clients, servers, autonomous systems, and cloud-based network resources may each use a different set of components, or, in the case of servers, for example, larger storage devices.

One example computing device in the form of a computer 500 (also referred to as computing device 500 and computer system 500) may include a processor 505, memory storage 510, removable storage 515, and non-removable storage 520, all connected by a bus 540. Although the example computing device is illustrated and described as the computer 500, the computing device may be in different forms in different embodiments. For example, the computing device may instead be a smartphone, a tablet, a smartwatch, or another computing device including elements the same as or similar to those illustrated and described with regard to FIG. 5. Devices such as smartphones, tablets, and smartwatches are collectively referred to as "mobile devices." Further, although the various data storage elements are illustrated as part of the computer 500, the storage may also or alternatively include cloud-based storage accessible via a network, such as the Internet, or server-based storage.

The memory storage 510 may include volatile memory 545 and non-volatile memory 550 and may store a program 555. The computer 500 may include, or have access to, a computing environment that includes a variety of computer-readable media, such as the volatile memory 545; the non-volatile memory 550; the removable storage 515; and the non-removable storage 520. Computer storage includes random-access memory (RAM), read-only memory (ROM), erasable programmable read-only memory (EPROM) and electrically erasable programmable read-only memory (EEPROM), flash memory or other memory technologies, compact disc read-only memory (CD ROM), digital versatile disks (DVD) or other optical disk storage, magnetic cassettes, magnetic tape, magnetic disk storage or other magnetic storage devices, or any other medium capable of storing computer-readable instructions.

The computer 500 may include or have access to a computing environment that includes an input interface 525, an output interface 530, and a communication interface 535. The output interface 530 may interface to or include a display device, such as a touchscreen, that also may serve as an input device. The input interface 525 may interface to or include one or more of a touchscreen, a touchpad, a mouse, a keyboard, a camera, one or more device-specific buttons, one or more sensors integrated within or coupled via wired or wireless data connections to the computer 500, and other input devices. The computer 500 may operate in a networked environment using the communication interface 535 to connect to one or more remote computers, such as database servers. The remote computer may include a personal computer (PC), server, router, network PC, peer device or other common network node, or the like. The communication interface 535 may connect to a local-area network (LAN), a wide-area network (WAN), a cellular network, a WiFi network, a Bluetooth network, or other networks.

Computer instructions stored on a computer-readable medium (e.g., the program 555 stored in the memory storage 510) are executable by the processor 505 of the computer 500. A hard drive, CD-ROM, and RAM are some examples of articles including a non-transitory computer-readable medium such as a storage device. The terms "computer-readable medium" and "storage device" do not include carrier waves to the extent that carrier waves are deemed too transitory. "Computer-readable non-transitory media" includes all types of computer-readable media, including magnetic storage media, optical storage media, flash media, and solid-state storage media. It should be understood that software can be installed in and sold with a computer. Alternatively, the software can be obtained and loaded into the computer, including obtaining the software through a physical medium or distribution system, including, for example, from a server owned by the software creator or from a server not owned but used by the software creator. The software can be stored on a server for distribution over the Internet, for example.

The program 555 is shown as including a configuration module 560 and a place and route module 565. Any one or more of the modules described herein may be implemented using hardware (e.g., a processor of a machine, an ASIC, an FPGA, or any suitable combination thereof). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The timing module 560 generates a selection of a timing mode. For example, the timing module 560 may provide a user interface to allow a user to select a timing mode from a plurality of timing modes. Based on the selected timing mode, the timing module 560 generates boundary conditions for a first circuit design being integrated with a second circuit design.

The place and route module 565 determines the physical layout of the resulting integrated circuit based on the first circuit design, the second circuit design, and the timing mode. For example, an integrated circuit comprising a first circuit in the form of an ASIC IP, a second circuit in the form of an EFPGA, and an interface cluster may be laid out at the physical level based on a selection of the timing scenario 200, the timing scenario 300, or the timing scenario 400.

Figure 6:
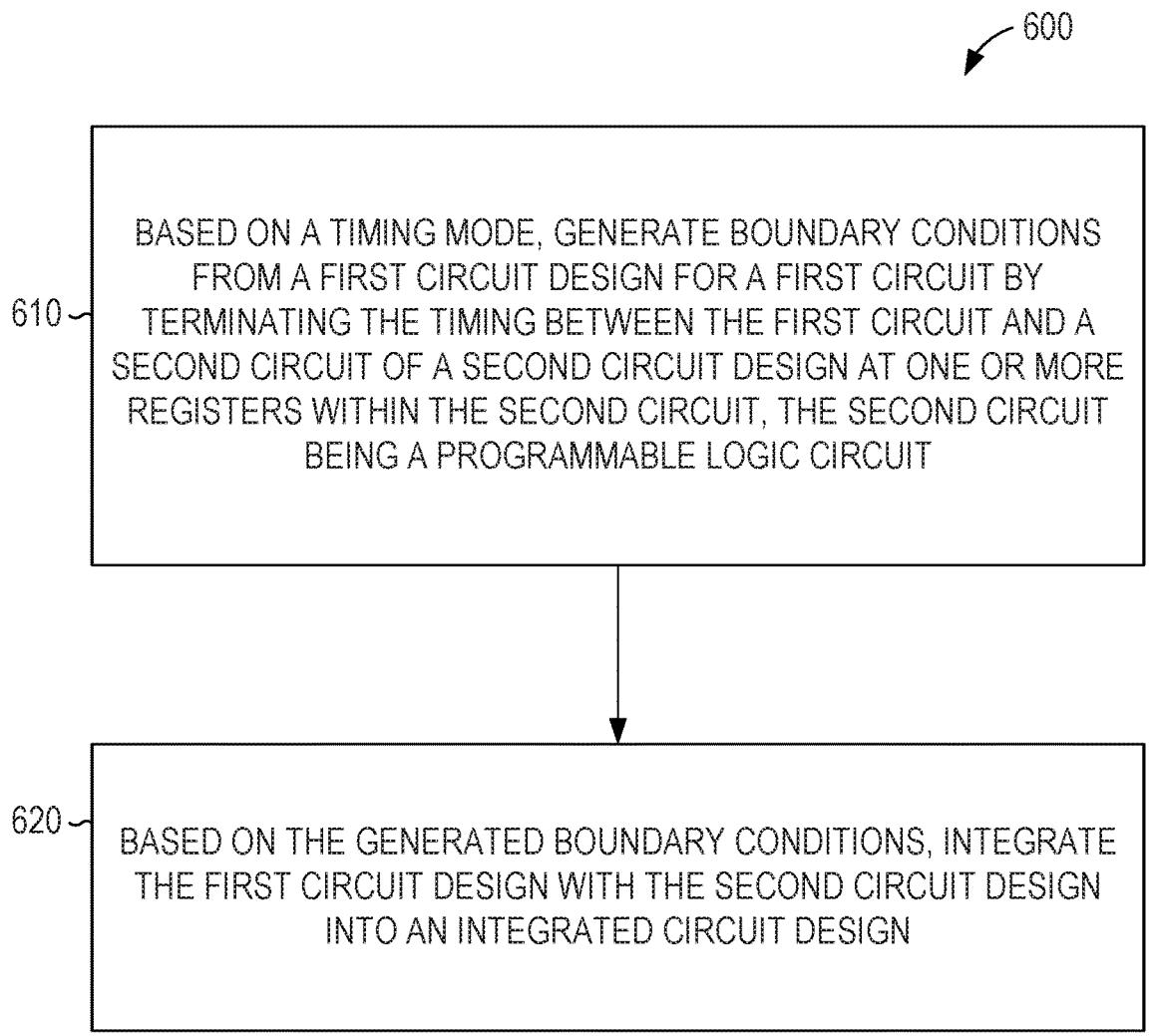
FIG. 6 is a flowchart illustrating operations of a method for integrating a first circuit design with a second circuit design, according to various embodiments of the invention.

FIG. 6 is a flowchart illustrating operations of a method 600 for integrating a first circuit design with a second circuit design, according to various embodiments of the invention. The method 600 comprises operations 610 and 620. By way of example and not limitation, the method 600 is described as being performed by the computer 500 of FIG. 5.

In operation 610, the timing module 560, based on a timing mode, generates boundary conditions for a first circuit design for a first circuit (e.g., an ASIC) by terminating the timing between the first circuit design and a second circuit of a second circuit design at one or more registers within the second circuit, with the second circuit being a programmable logic circuit (e.g., an EFPGA). For example, one or more of the timing scenarios 200-400 may be used in the timing mode 100 to determine the boundary conditions.

In operation 620, the place and route module 565, based on the generated boundary conditions, integrates the first circuit design with the second circuit design into an integrated circuit design. The integrated circuit design may be fabricated into an integrated circuit. The resulting integrated circuit, by using the timing mode 100, has superior performance when compared to integrated circuits fabricated using prior art timing modes due to reduced clock delays at the interface between the first circuit design and the second circuit design.

In some example embodiments, the generating of the boundary conditions comprises performing a timing analysis of the first circuit. For example, the delay at each of the outputs of the first circuit relative to the clock signal of the first circuit may be determined. In some example embodiments, the integrating of the first circuit design with the second circuit design comprises determining a location of a register in the second circuit based on the timing analysis of the first circuit.

Considering a single output from the first circuit, by combining the delay at the boundary of the first circuit with a delay to each of a set of registers in the second circuit, the total delay to each register can be determined and compared to a predetermined threshold (e.g., a maximum allowable delay). One of the registers that meets the timing requirements is selected as the register to store the output from the first circuit. This process is repeated for each output from the first circuit, causing the terminating registers for the first circuit to be placed at appropriate locations within the second circuit.

The first circuit may be fabricated before the integration of the first circuit design with the second circuit design. For example, a circuit that combines the ASIC of the first circuit with an unprogrammed FPGA fabric may be fabricated. The integrated circuit design determined in operation 620 is realized by programming the existing FPGA fabric.

Figure 7:
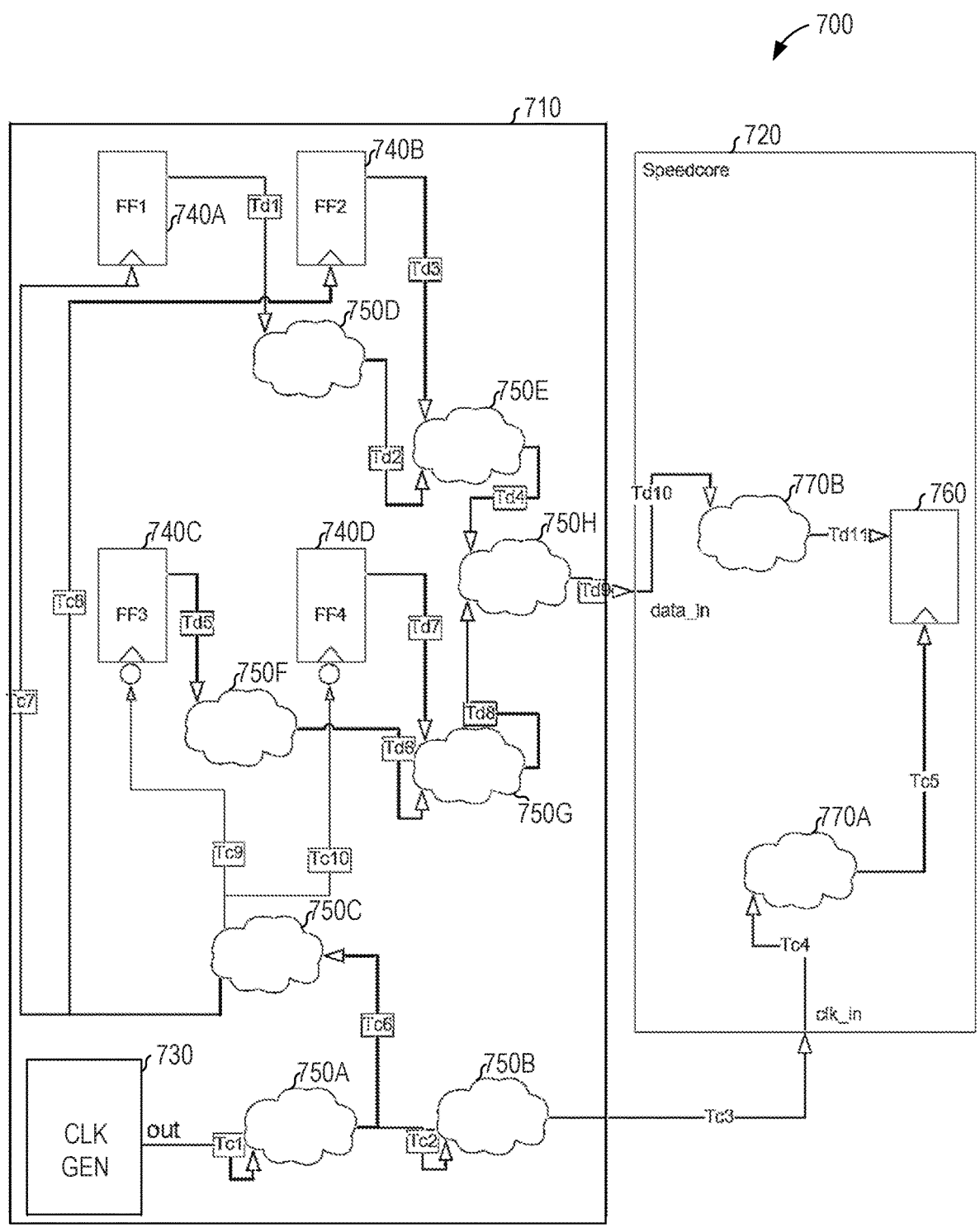
FIG. 7 is a diagrammatic view of a circuit providing a clock signal and data to an embedded FPGA, according to some example embodiments.

FIG. 7 is a diagrammatic view of a circuit 700 providing a clock signal and data from a first circuit 710 to an embedded FPGA 720, according to some example embodiments. The first circuit 710 comprises clock generator 730; registers (also referred to as flip-flops) 740A, 740B, 740C, and 740D; and logic blocks 750A, 750B, 750C, 750D, 750E, 750F, 750G, and 750H. The embedded FPGA 720 comprises register 760 and logic blocks 770A and 770B.

The logic blocks 750A-750H and 770A-770B may be composed of any number of basic circuit elements. Thus, there is a time lag between the input of a clock or data signal to a logic element and the output from the logic element. This is shown in FIG. 7 as Tc1-Tc10, indicating 10 different delays on the clock signal generated by the clock generator 730, and as Td1-Td11, indicating 11 different delays on data signals. If the clock and data signals to a logic block are not synchronized, the data signal must be stored in a register so that it can be accessed by the logic block at the time the logic element is ready to access the data.

Timing constraints thus assist in the placement of the registers 740A-740D and 760. If the timing constraints for a logic block are met and the clock and data signals are synchronized (within the margin of error), no register needs to be inserted. If the clock and data signals are not synchronized, a register is added to meet the timing constraints. Since the value of the register is set in the clock cycle before the value is read, the addition of a register introduces a delay in the circuit.

In the circuit 700, both clock and data are being input to the embedded FPGA 720, but the route taken by the clock signal and the data are distinct. Thus, the delays Td9 and Tc3 may not be equal. Additionally, the logic blocks 770A and 770B may have unequal delays, thereby increasing or decreasing the timing difference at the register 760.

To determine the timing constraints for the circuit 700, margins are defined. In some example embodiments, the launch clock has a margin of +5% on-chip variation (OCV) for setup and −5% OCV for hold; the datapath has a margin of +5% ODV for setup and −5% OCV for hold; and the capture clock has a margin of −5% OCV for setup and +5% OCV for hold. Additionally, assumptions are made to allow the calculations to be performed. In some example embodiments, the assumptions are that the path from FF1 (the register 740A) is setup critical for positive-edge launched clock; the path from FF2 (the register 740B) is hold critical for positive-edge launched clock; the path from FF3 (the register 740C) is setup critical for negative-edged launch clock; the path from FF4 (the register 740D) is hold critical for negative-edged launched clock; and each delay has a maximum and minimum value and a rise and fall value. Additional values include a launch clock delay value, a data path delay value, and a capture clock delay value. The launch clock delay value, data path delay value, and capture clock delay value are determined by analysis of the first circuit 710. For example, by simulation of the clock generator 730, registers 740A-740D, and logic elements 750A-750H, the various delay values between the nominal clock timing and the propagation of clock and data signals to the edge of the first circuit 710 or the embedded FPGA 720 are determined. Based on these margins and values, the following variables are defined:

Ta_Mr—max, rise delay
Ta_Mf—max, fall delay
Ta_M—max delay
Ta_mr—min, rise delay
Ta_mf—min, fall delay
Ta_m—min delay
Ts—setup time of the capture clock
Th—hold time of the capture clock
Tp—period of the launched clock Using the margins, defined variables, and delays through the logic blocks, equations are defined that allow solving for the timing constraints.

Positive-edge setup critical timing for data rising through data_in:

$$1.05*(Tc1\_Mr+Tc6\_Mr+Tc7\_Mr)+1.05*(Td1\_Mr+Td2\_Mf+Td4\_Mf+Td9\_Mr+Td10\_Mr+Td11\_Mf)$$
$$<=0.95*(Tc1\_mr+Tc2\_mr+Tc3\_mr+Tc4\_mr+Tc5\_mr)+Tp-Ts+CRPR1$$

Positive-edge setup critical timing for data falling through data_in:

$$1.05*(Tc1\_Mr+Tc6\_Mr+Tc7\_Mr)+1.05*(Td1\_Mr+Td2\_Mf+Td4\_Mf+Td9\_Mf+Td10\_Mf+Td11\_Mf)$$
$$<=0.95*(Tc1\_mr+Tc2\_mr+Tc3\_mr+Tc4\_mr+Tc5\_mr)+Tp-Ts+CRPR2$$

Negative-edge setup critical timing for data rising through data_in:

$$1.05*(Tc1\_Mf+Tc6\_Mf+Tc9\_Mf)+1.05*(Td5\_Mr+Td6\_Mf+Td8\_Mf+Td9\_Mr+Td10\_Mr+Td1\_Mf)+Tp/2<=0.95*(Tc1\_mr+Tc2\_mr+Tc3\_mr+Tc4\_mr+Tc5\_mr)+Tp-Ts+CRPR3$$

Negative-edge setup critical timing for data falling through data_in:

$$1.05*(Tc1\_Mf+Tc6\_Mf+Tc9\_Mf)+1.05*(Td5\_Mr+Td6\_Mf+Td8\_Mf+Td9\_Mf+Td10\_Mf+Td11\_Mf)+Tp/2<=0.95*(Tc1\_mr+Tc2\_mr+Tc3\_mr+Tc4\_mr+Tc5\_mr)+Tp-Ts+CRPR4$$

Positive-edge hold critical timing for data rising through data_in:

$$0.95*(Tc1\_mr+Tc6\_mr+Tc8\_mr)+0.95*(Td3\_mr+Td4\_mf+Td9\_mr+Td10\_mr+Td11\_mf)>=1.05*(Tc1\_Mr+Tc2\_Mr+Tc3\_Mr+Tc4\_Mr+Tc5\_Mr)+Th+CRPR5$$

Positive-edge hold critical timing for data falling through data_in:

$$0.95*(Tc1\_mr+Tc6\_mr+Tc8\_mr)+0.95*(Td3\_mr+Td4\_mf+Td9\_mf+Td10\_mf+Td11\_mf)>=1.05*(Tc1\_Mr+Tc2\_Mr+Tc3\_Mr+Tc4\_Mr+Tc5\_Mr)+Th+CRPR6$$

Negative-edge hold critical timing for data rising through data_in:

$$0.95*(Tc1\_mf+Tc6\_mf+Tc10\_mf)+0.95*(Td7\_mr+Td8\_mf+Td9\_mr+Td10\_mr+Td11\_mf)+Tp/2>=1.05*(Tc1\_Mr+Tc2\_Mr+Tc3\_Mr+Tc4\_Mr+Tc5\_Mr)+Th+CRPR7$$

Negative-edge hold critical timing for data falling through data_in:

$$0.95*(Tc1\_mf+Tc6\_mf+Tc10\_mf)+0.95*(Td7\_mr+Td8\_mf+Td9\_mf+Td10\_mf+Td11\_mf)+Tp/2>=1.05*(Tc1\_Mr+Tc2\_Mr+Tc3\_Mr+Tc4\_Mr+Tc5\_Mr)+Th+CRPR8$$

After solving for the eight clock reconvergence pessimism removal (CRPR) values, the clocks and delays are defined:

Clock definitions & delays

```
create_clock CLK -period Tp[get_ports clk_in]

create_clock VCLK -period Tp
```

```
set_clock_latency -source -late -rise [expr 1.05*
    (Tc1_Mr+Tc2_Mr+Tc3_Mr)][get_clocks CLK]

set_clock_latency -source -late -fall [expr 1.05*
    (Tc1_Mf+Tc2_Mf+Tc3_Mf)][get_clocks CLK]

set_clock_latency -source -early -rise [expr 0.95*
    (Tc1_mr+Tc2_mr+Tc3_mr)][get_clocks CLK]

set_clock_latency -source -early -fall [expr 0.95*
    (Tc1_mf+Tc2_mf+Tc3_mf)][get_clocks CLK]
Data delays
set_input_delay -clock VCLK -rise -max -add_delay
    [expr 1.05*(Tc1_Mr+Tc6_Mr+Tc7_Mr)+1.05*
    (Td1_Mr+Td2_Mf+Td4_Mf+Td9_Mr)-CRPR1]
    [get_ports data_in]

set_input_delay -clock VCLK -fall -max -add_delay
    [expr 1.05*(Tc1_Mr+Tc6_Mr+Tc7_Mr)+1.05*
    (Td1_Mr+Td2_Mf+Td4_Mf+Td9_Mf)-CRPR2]
    [get_ports data_in]

set_input_delay -clock VCLK -clock_fall -rise -max
    -add_delay [expr 1.05*(Tc1_Mf+Tc6_Mf+
    Tc9_Mf)+1.05*(Td5_Mr+Td6_Mf+Td8_Mf+
    Td9_Mr)-CRPR3][get_ports data_in]

set_input_delay -clock VCLK -clock_fall -fall -max
    -add_delay [expr 1.05*(Tc1_Mf+Tc6_Mf+
    Tc9_Mf)+1.05*(Td5_Mr+Td6_Mf+Td8_Mf+
    Td9_Mf)-CRPR4][get_ports data_in]

set_input_delay -clock VCLK -rise -min -add_delay
    [expr 0.95*(Tc1_mr+Tc6_mr+Tc7_mr)+0.95*
    (Td3_mr+Td4_mf+Td9_mr)-CRPR5][get_ports
    data_in]

set_input_delay -clock VCLK -fall -min -add_delay
    [expr 0.95*(Tc1_mr+Tc6_mr+Tc7_mr)+0.95*
    (Td3_mr+Td4_mf+Td9_mf)-CRPR6][get_ports
    data_in]

set_input_delay -clock VCLK -clock_fall -rise -min
    -add_delay [expr 0.95*(Tc1_mf+Tc6_mf+
    Tc10_mf)+0.95*(Td7_mr+Td8_mf+Td9_mr)-
    CRPR7][get_ports data_in]

set_input_delay -clock VCLK -clock_fall -fall -min
    -add_delay [expr 0.95*(Tc1_mr+Tc6_mr+
    Tc7_mr)+0.95*(Td3_mr+Td4_mf+Td9_mf)-
    CRPR8][get_ports data_in]
```

Using the defined clocks, the timing checks are performed:

Positive-edge setup critical timing for data rising through data_in:

```
<clock_rise_max_rise_input_delay on data_in>+
    1.05*(Td10_Mr+Td11_Mf)<=<min_rise_latency
    on clk_in>+0.95*(Tc4_mr+Tc5_mr)+Tp-Ts =>1.05*(Tc1_Mr+Tc6_Mr+Tc7_Mr)+1.05*(Td1_Mr+
    Td2_Mf+Td4_Mf+Td9_Mr)-CRPR1+1.05*
    (Td10_Mr+Td11_Mf)<=0.95*(Tc1_mr+Tc2_mr+
    Tc3_mr)+0.95*(Tc4_mr+Tc5_mr)+Tp-Ts
```

Positive-edge setup critical timing for data falling through data_in:

```
<clock_rise_max_fall_input_delay on data_in>+
    1.05*(Td10_Mf+Td11_Mf)<=<min_rise_latency
    on clk_in>+0.95*(Tc4_mr+Tc5_mr)+Tp-Ts =>1.05*(Tc1_Mr+Tc6_Mr+Tc7_Mr)+1.05*(Td1_Mr+
    Td2_Mf+Td4_Mf+Td9_Mf)-CRPR2+1.05*
    (Td10_Mf+Td11_Mf)<=0.95*(Tc1_mr+Tc2_mr+
    Tc2_mr+Tc3_mr)+0.95*(Tc4_mr+Tc5_mr)+Tp-
    Ts
```

Negative-edge setup critical timing for data rising through data_in:

```
<clock_fall_max_rise_input_delay on data_in>+
    1.05*(Td10_Mr+Td11_Mf)+Tp/2<=<min_rise-
    _latency on clk_in>+0.95*(Tc4_mr+Tc5_mr)+
    Tp-Ts =>1.05*(Tc1_Mf+Tc6_Mf+Tc9_Mf)+1.05*(Td5_Mr+
    Td6_Mf+Td8_Mf+Td9_Mr)-CRPR3+1.05*
    (Td10_Mr+Td1_Mf)+Tp/2<=0.95*(Tc1_mr+
    Tc2_mr+Tc3_mr)+0.95*(Tc4_mr+Tc5_mr)+Tp-
    Ts
```

Negative-edge setup critical timing for data falling through data_in:

```
<clock_fall_max_fall_input_delay on data_in>+1.05*
    (Td10_Mf+Td11_Mf)+Tp/2<=<min_rise_latency
    on clk_in>+0.95*(Tc4_mr+Tc5_mr)+Tp-Ts =>1.05*(Tc1_Mf+Tc6_Mf+Tc9_Mf)+1.05*(Td5_Mr+
    Td6_Mf+Td8_Mf+Td9_Mf)-CRPR4+1.05*
    (Td10_Mf+Td11_Mf)+Tp/2<=0.95*(Tc1_mr+
    Tc2_mr+Tc3_mr)+0.95*(Tc4_mr+Tc5_mr)+Tp-
    Ts
```

Positive-edge hold critical timing for data rising through data_in:

```
<clock_rise_min_rise_input_delay on data_in>+
    0.95*(Td10_mr+Td1_mf)>=<max_rise_latency
    on clk_in>+1.05*(Tc4_Mr+Tc5_Mr)+Th =>0.95*(Tc1_mr+Tc6_mr+Tc8_mr)+0.95*(Td3_mr+
    Td4_mf+Td9_mr)-CRPR5+0.95*(Td10_mr+
    Td11_mf)>=1.05*(Tc1_Mr+Tc2_Mr+Tc3_Mr)+
    1.05*(Tc4_Mr+Tc5_Mr)+Th
```

Positive-edge hold critical timing for data falling through data_in:

```
<clock_rise_min_fall_input_delay on data_in>+0.95*
    (Td10_mf+Td11_mf)>=<max_rise_latency on
    clk_in>+1.05*(Tc4_Mr+Tc5_Mr)+Th =>0.95*(Tc1_mr+Tc6_mr+Tc8_mr)+0.95*(Td3_mr+
    Td4_mf+Td9_mf)-CRPR6+0.95*(Td10_mf+
    Td11_mf)>=1.05*(Tc1_Mr+Tc2_Mr+Tc3_Mr)+
    1.05*(Tc4_Mr+Tc5_Mr)+Th
```

Negative-edge hold critical timing for data rising through data_in:

```
<clock_fall_min_rise_input_delay on data_in>+0.95*
    (Td10_mr+Td11_mf)+Tp/2>=<max_rise_latency
    on clk_in>+1.05*(Tc4_Mr+Tc5_Mr)+Th =>0.95*(Tc1_mf+Tc6_mf+Tc10_mf)+0.95*(Td7_mr+
    Td8_mf+Td9_mr)-CRPR7+0.95*(Td10_mr+
    Td11_mf)+Tp/2>=1.05*(Tc1_Mr+Tc2_Mr+
    Tc3_Mr)+1.05*(Tc4_Mr+Tc5_Mr)+Th
```

Negative-edge hold critical timing for data falling through data_in:

```
<clock_fall_min_fall_input_delay on data_in>+0.95*
    (Td10_mf+Td11_mf)+Tp/2>=<max_rise_latency
    on clk_in>+1.05*(Tc4_Mr+Tc5_Mr)+Th =>0.95*(Tc1_mf+Tc6_mf+Tc10_mf)+0.95*(Td7_mr+
    Td8_mf+Td9_mf)-CRPR8+0.95*(Td10_mf+
    Td11_mf)+Tp/2>=1.05*(Tc1_Mr+Tc2_Mr+
    Tc3_Mr)+1.05*(Tc4_Mr+Tc5_Mr)+Th
```

Figure 8:
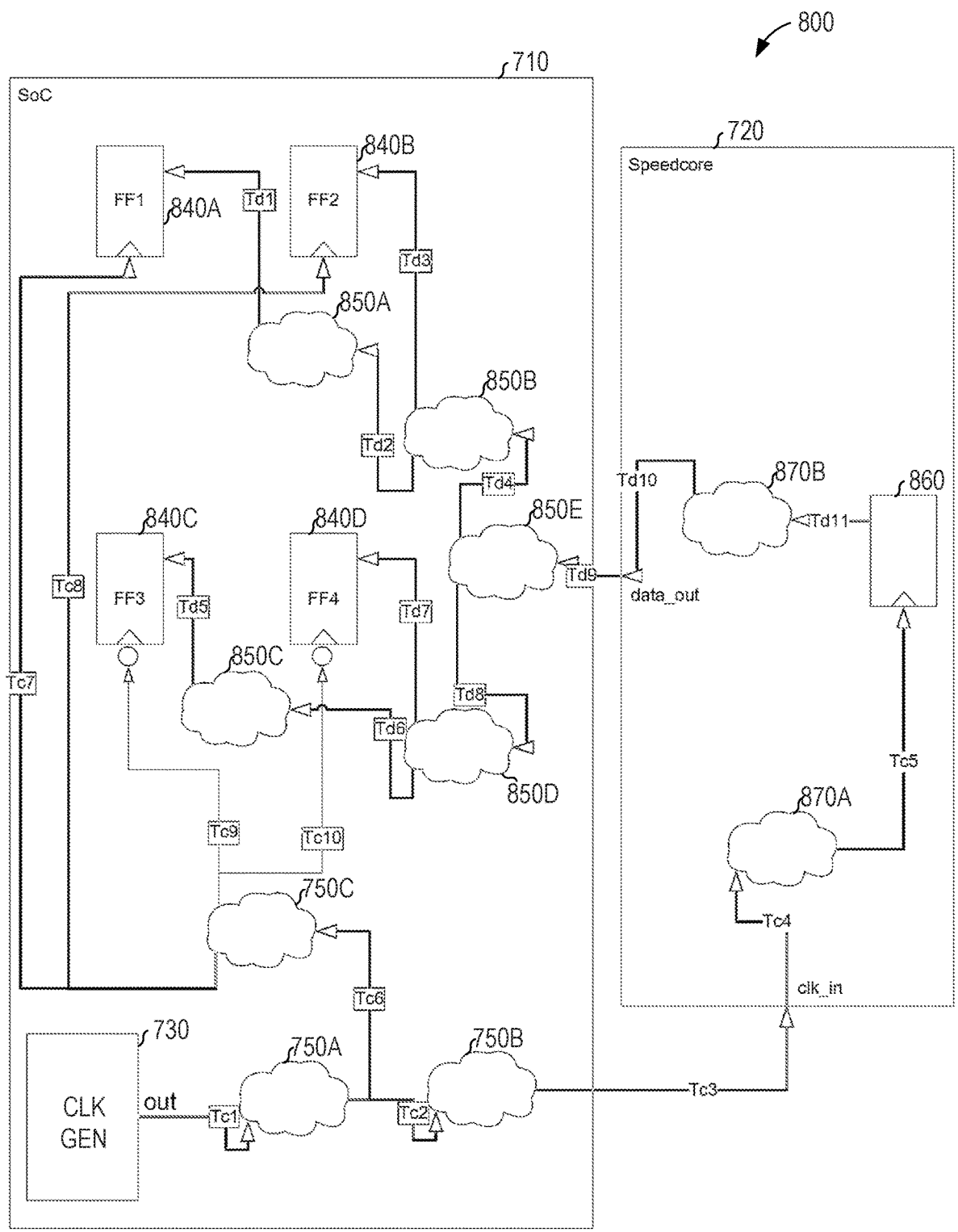
FIG. 8 is a diagrammatic view of a circuit providing a clock signal to an embedded FPGA and receiving data from the embedded FPGA, according to some example embodiments.

FIG. 8 is a diagrammatic view of a circuit 800 providing a clock signal from a first circuit 710 to an embedded FPGA 720, the first circuit 710 receiving data from the embedded FPGA 720, according to some example embodiments. The first circuit 710, the embedded FPGA 720, the clock generator 730, and the logic blocks 750A-750C are the same circuits shown in FIG. 7, but FIG. 8 deals with the return data path from the embedded FPGA 720 to the first circuit 710. Thus, the first circuit 710 further comprises logic blocks 850A, 850B, 850C, and 850D and supporting registers 840A, 840B, 840C, and 840D, none of which were shown in FIG. 7. Likewise, the embedded FPGA 720 further comprises logic blocks 870A and 870B and supporting register 860, which were not shown in FIG. 7. As in FIG. 7, timing constraints assist in the placement of the registers 840A-840D and 860.

For clarity, FIGS. 7-8 each show a single example of a clock and data path connecting the first circuit 710 with the embedded FPGA 720, but it should be understood that a practical circuit likely includes many data paths in both directions between the first circuit 710 and the embedded FPGA 720.

The same margins, assumptions, and variable definitions used for the circuit 700 are used for the circuit 800. Equations are defined that allow solving for the timing constraints.

Positive-edge setup critical timing for data rising through data_in:

$$1.05*(Tc1\_Mr+Tc2\_Mr+Tc3\_Mr+Tc4\_Mr+Tc5\_Mr)+$$
$$1.05*(Td11\_Mf+Td10\_Mr+Td9\_Mr+Td4\_Mf+$$
$$Td2\_Mf+Td1\_Mr) <= 0.95*(Tc1\_mr+Tc6\_mr+$$
$$Tc7\_mr)+Tp-Ts+CRPR1$$

Positive-edge setup critical timing for data falling through data_in:

$$1.05*(Tc1\_Mr+Tc2\_Mr+Tc3\_Mr+Tc4\_Mr+Tc5\_Mr)+$$
$$1.05*(Td11\_Mf+Td10\_Mf+Td9\_Mf+Td4\_Mf+$$
$$Td2\_Mf+Td1\_Mr) <= 0.95*(Tc1\_mr+Tc6\_mr+$$
$$Tc7\_mr)+Tp-Ts+CRPR2$$

Negative-edge setup critical timing for data rising through data_in:

$$1.05*(Tc1\_Mr+Tc2\_Mr+Tc3\_Mr+Tc4\_Mr+Tc5\_Mr)+$$
$$1.05*(Td11\_Mf+Td10\_Mr+Td8\_Mr+Td8\_Mf+$$
$$Td6\_Mf+Td5\_Mr) <= 0.95*(Tc1\_mf+Tc6\_mf+$$
$$Tc9\_mf)+Tp/2-Ts+CRPR3$$

Negative-edge setup critical timing for data falling through data_in:

$$1.05*(Tc1\_Mr+Tc2\_Mr+Tc3\_Mr+Tc4\_Mr+Tc5\_Mr)+$$
$$1.05*(Td11\_Mf+Td10\_Mf+Td9\_Mf+Td8\_Mf+$$
$$Td6\_Mf+Td5\_Mr) <= 0.95*(Tc1\_mf+Tc6\_mf+$$
$$Tc9\_mf)+Tp/2-Ts+CRPR4$$

Positive-edge hold critical timing for data rising through data_in:

$$0.95*(Tc1\_mr+Tc2\_mr+Tc3\_mr+Tc4\_mr+Tc5\_mr)+$$
$$0.95*(Td11\_mf+Td10\_mr+Td9\_mr+Td4\_mf+$$
$$Td3\_mr) >= 1.05*(Tc1\_Mr+Tc6\_Mr+Tc8\_Mr)+$$
$$Th+CRPR5$$

Positive-edge hold critical timing for data falling through data_in:

$$0.95*(Tc1\_mr+Tc2\_mr+Tc3\_mr+Tc4\_mr+Tc5\_mr)+$$
$$0.95*(Td11\_mf+Td10\_mf+Td9\_mf+Td4\_mf+$$
$$Td3\_mr) >= 1.05*(Tc1\_Mr+Tc6\_Mr+Tc8\_Mr)+$$
$$Th+CRPR6$$

Negative-edge hold critical timing for data rising through data_in:

$$0.95*(Tc1\_mr+Tc2\_mr+Tc3\_mr+Tc4\_mr+Tc5\_mr)+$$
$$0.95*(Td11\_mf+Td0\_mr+Td8\_mf+$$
$$Td7\_mr) >= 1.05*(Tc1\_Mf+Tc6\_Mf+Tc10\_Mf)+$$
$$Th-Tp/2+CRPR7$$

Negative-edge hold critical timing for data falling through data_in:

$$0.95*(Tc1\_mr+Tc2\_mr+Tc3\_mr+Tc4\_mr+Tc5\_mr)+$$
$$0.95*(Td11\_mf+Td10\_mf+Td9\_mf+Td8\_mf+$$
$$Td7\_mr) >= 1.05*(Tc1\_Mf+Tc6\_Mf+Tc10\_Mf)+$$
$$Th-Tp/2+CRPR8$$

After solving for the eight CRPR values, the clocks and delays are defined:

Clock definitions & delays create_clock CLK -period $Tp$[get_ports clk_in]

create_clock VCLK -period $Tp$ set_clock_latency -source -late -rise [expr 1.05*
  $(Tc1\_Mr+Tc2\_Mr+Tc3\_Mr)$][get_clocks CLK]

set_clock_latency -source -late -fall [expr 1.05*
  $(Tc1\_Mf+Tc2\_Mf+Tc3\_Mf)$][get_clocks CLK]

set_clock_latency -source -early -rise [expr 0.95*
  $(Tc1\_mr+Tc2\_mr+Tc3\_mr)$][get_clocks CLK]

set_clock_latency -source -early -fall [expr 0.95*
  $(Tc1\_mf+Tc2\_mf+Tc3\_mf)$][get_clocks CLK]

Data delays set_output_delay -clock VCLK -rise -max -add_delay [expr 1.05*$(Td9\_Mr+Td4\_Mf+Td2\_Mf+Td1\_Mr)$−0.95*$(Tc1\_mr+Tc6\_mr+Tc7\_mr)+Ts$−CRPR1][get_ports data_out]

set_output_delay -clock VCLK -fall -max -add_delay [expr 1.05*$(Td9\_Mf+Td4\_Mf+Td2\_Mf+Td1\_Mr)$−0.95*$(Tc1\_mr+Tc6\_mr+Tc7\_mr)+Ts$−CRPR2][get_ports data_out]

set_output_delay -clock VCLK -clock_fall -rise -max -add_delay [expr 1.05*$(Td9\_Mr+Td8\_Mf+Td6\_Mf+Td5\_Mr)$−0.95*$(Tc1\_mf+Tc6\_mf+Tc9\_mf)+Ts$−CRPR3][get_ports data_out]

set_output_delay -clock VCLK -clock_fall -fall -max -add_delay [expr 1.05*$(Td9\_Mf+Td8\_Mf+Td6\_Mf+Td5\_Mr)$−0.95*$(Tc1\_mf+Tc6\_mf+Tc9\_mf)+Ts$−CRPR4][get_ports data_out]

set_output_delay -clock VCLK -rise -min -add_delay [expr 0.95*$(Td9\_mr+Td4\_mf+Td3\_mr)$−1.05*$(Tc1\_Mr+Tc6\_Mr+Tc8\_Mr)−Th$−CRPR5][get_ports data_out]

set_output_delay -clock VCLK -fall -min -add_delay [expr 0.95*$(Td9\_mf+Td4\_mf+Td3\_mr)$−1.05*$(Tc1\_Mr+Tc6\_Mr+Tc8\_Mr)−Th$−CRPR6][get_ports data_out]

set_output_delay -clock VCLK -clock_fall -rise -min -add_delay [expr 0.95*$(Td9\_mr+Td8\_mf+Td7\_mr)$−1.05*$(Tc1\_Mf+Tc6\_Mf+Tc10\_Mf)−Th$−CRPR7][get_ports data_out]

set_output_delay -clock VCLK -clock_fall -fall -min -add_delay [expr 0.95*$(Td9\_mf+Td8\_mf+Td7\_mr)$−1.05*$(Tc1\_Mf+Tc6\_Mf+Tc10\_Mf)−Th$−CRPR8][get_ports data_out]

Figure 9:
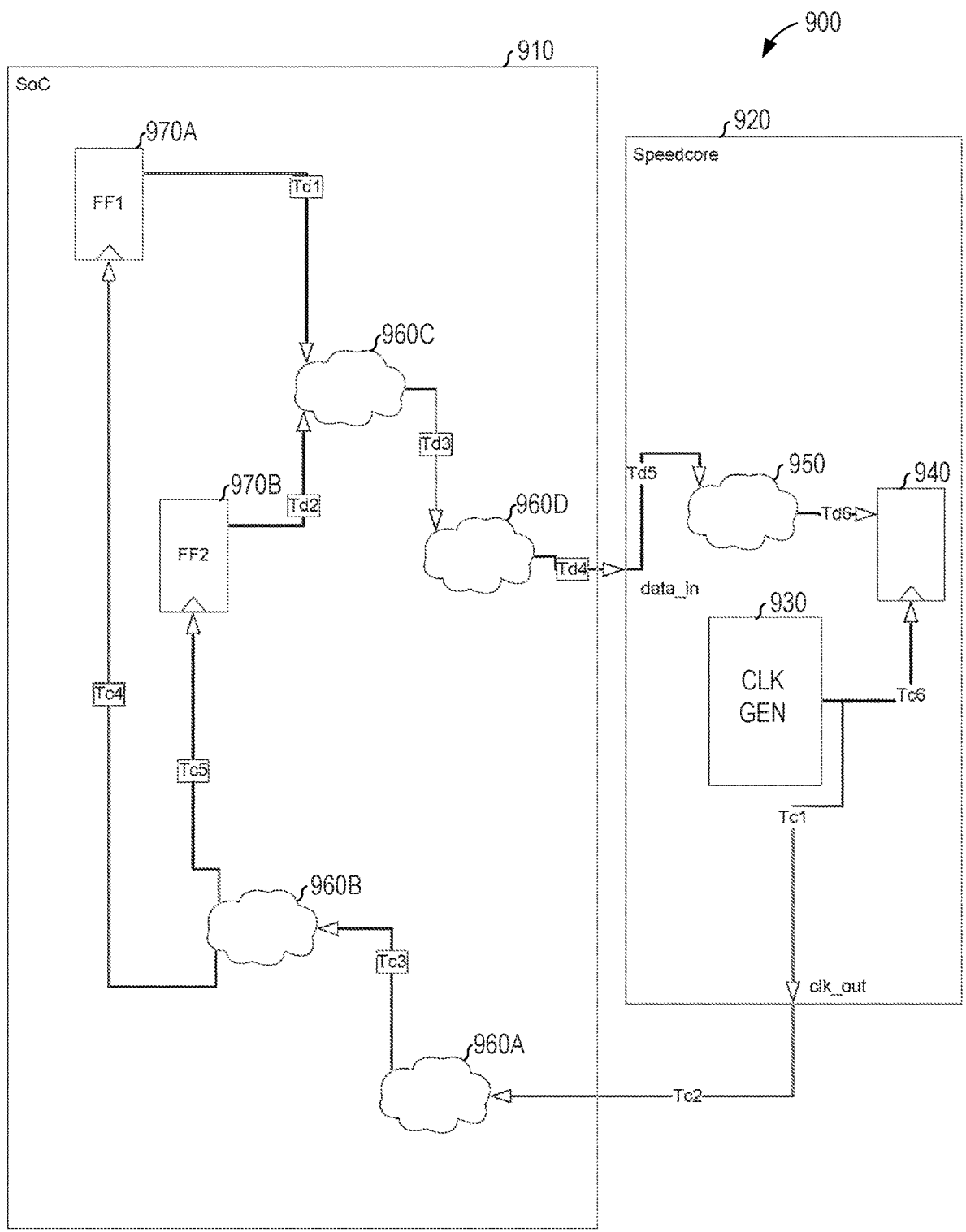
FIG. 9 is a diagrammatic view of a circuit providing data to an embedded FPGA and receiving a clock signal from the embedded FPGA, according to some example embodiments.

Using the defined clocks, the timing checks are performed:

Positive-edge setup critical timing for data rising through data_in:

<clock_rise_max_rise_input_delay on data_in>+
  1.05*$(Td10\_Mr+Td11\_Mf)$<=<min_rise_latency
  on clk_in>+0.95*$(Tc4\_mr+Tc5\_mr)+Tp-Ts$ =>1.05*$(Tc1\_Mr+Tc6\_Mr+Tc7\_Mr)$+1.05*$(Td1\_Mr+Td2\_Mf+Td4\_Mf+Td9\_Mr)$−CRPR1+1.05*
  $(Td10Mr+Td1\_Mf)$<=0.95*$(Tc1\_mr+Tc2\_mr+Tc3\_mr)$+0.95*$(Tc4\_mr+Tc5\_mr)+Tp-Ts$ Positive-edge setup critical timing for data falling through data_in:

<clock_rise_max_fall_input_delay on data_in>+
1.05*($Td10\_Mf+Td11\_Mf$)<=<min_rise_latency on clk_in>+0.95*($Tc4\_mr+Tc5\_mr$)+$Tp-Ts$ =>1.05*($Tc1\_Mr+Tc6\_Mr+Tc7\_Mr$)+1.05*($Td1\_Mr+Td2\_Mf+Td4\_Mf+Td9\_Mf$)−CRPR2+1.05*($Td10\_Mf+Td11\_Mf$)<=0.95*($Tc1\_mr+Tc2\_mr+Tc2\_mr+Tc3mr$)+0.95*($Tc4\_mr+Tc5\_mr$)+$Tp-Ts$ Negative-edge setup critical timing for data rising through data_in:

<clock_fall_max_rise_input_delay on data_in>+
1.05*($Td10\_Mr+Td11\_Mf$)+$Tp/2$<=<min_rise_latency on clk_in>+0.95*($Tc4\_mr+Tc5\_mr$)+$Tp-Ts$ =>1.05*($Tc1\_Mf+Tc6\_Mf+Tc9\_Mf$)+1.05*($Td5\_Mr+Td6\_Mf+Td8\_Mf+Td9\_Mr$)−CRPR3+1.05*($Td10\_Mr+Td11\_Mf$)+$Tp/2$<=0.95*($Tc1\_mr+Tc2\_mr+Tc3\_mr$)+0.95*($Tc4\_mr+Tc5\_mr$)+$Tp-Ts$ Negative-edge setup critical timing for data falling through data_in:

<clock_fall_max_fall_input_delay on data_in>+1.05*($Td10\_Mf+Td11\_Mf$)+$Tp/2$<=<min_rise_latency on clk_in>+0.95*($Tc4\_mr+Tc5\_mr$)+$Tp-Ts$ =>1.05*($Tc1\_Mf+Tc6\_Mf+Tc9\_Mf$)+1.05*($Td5\_Mr+Td6\_Mf+Td8\_Mf+Td9\_Mf$)−CRPR4+1.05*($Td10\_Mf+Td1\_Mf$)+$Tp/2$<=0.95*($Tc1\_mr+Tc2\_mr+Tc3\_mr$)+0.95*($Tc4\_mr+Tc5\_mr$)+$Tp-Ts$ Positive-edge hold critical timing for data rising through data_in:

<clock_rise_min_rise_input_delay on data_in>+
0.95*($Td10\_mr+Td11\_mf$)>=<max_rise_latency on clk_in>+1.05*($Tc4\_Mr+Tc5\_Mr$)+$Th$ =>0.95*($Tc1\_mr+Tc6\_mr+Tc8\_mr$)+0.95*($Td3\_mr+Td4\_mf+Td9\_mr$)−CRPR5+0.95*($Td10\_mr+Td1\_mf$)>=1.05*($Tc1\_Mr+Tc2\_Mr+Tc3\_Mr$)+1.05*($Tc4\_Mr+Tc5\_Mr$)+$Th$ Positive-edge hold critical timing for data falling through data_in:

<clock_rise_min_fall_input_delay on data_in>+0.95*($Td10\_mf+Td11\_mf$)>=<max_rise_latency on clk_in>+1.05*($Tc4\_Mr+Tc5\_Mr$)+$Th$ =>0.95*($Tc1\_mr+Tc6\_mr+Tc8\_mr$)+0.95*($Td3\_mr+Td4\_mf+Td9\_mf$)−CRPR6+0.95*($Td10\_mf+Td11\_mf$)>=1.05*($Tc1\_Mr+Tc2\_Mr+Tc3\_Mr$)+1.05*($Tc4\_Mr+Tc5\_Mr$)+$Th$ Negative-edge hold critical timing for data rising through data_in:

<clock_fall_min_rise_input_delay on data_in>+0.95*($Td10\_mr+Td11\_mf$)+$Tp/2$>=<max_rise_latency on clk_in>+1.05*($Tc4\_Mr+Tc5\_Mr$)+$Th$ =>0.95*($Tc1\_mf+Tc6\_mf+Tc10\_mf$)+0.95*($Td7\_mr+Td8\_mf+Td9\_mr$)−CRPR7+0.95*($Td10\_mr+Td11\_mf$)+$Tp/2$>=1.05*($Tc1\_Mr+Tc2\_Mr+Tc3\_Mr$)+1.05*($Tc4\_Mr+Tc5\_Mr$)+$Th$ Negative-edge hold critical timing for data falling through data_in:

<clock_fall_min_fall_input_delay on data_in>+0.95*($Td10\_mf+Td11\_mf$)+$Tp/2$>=<max_rise_latency on clk_in>+1.05*($Tc4\_Mr+Tc5\_Mr$)+$Th$ =>0.95*($Tc1\_mf+Tc6\_mf+Tc10\_mf$)+0.95*($Td7\_mr+Td8\_mf+Td9\_mf$)−CRPR8+0.95*($Td10\_mf+Td11\_mf$)+$Tp/2$>=1.05*($Tc1\_Mr+Tc2\_Mr+Tc3\_Mr$)+1.05*($Tc4\_Mr+Tc5\_Mr$)+$Th$ FIG. 9 is a diagrammatic view of a circuit 900 providing data from a first circuit 910 to an embedded FPGA 920, the first circuit 910 receiving a clock signal from the embedded FPGA 920, according to some example embodiments. The first circuit 910 comprises registers 970A and 970B and logic blocks 960A, 960B, 960C, and 960D. The embedded FPGA 920 comprises a clock generator 930, register 940, and logic block 950.

The logic blocks 950 and 960A-960D may be composed of any number of basic circuit elements. Thus, there is a time lag between the input of a clock or data signal to a logic element and the output from the logic element. This is shown in FIG. 9 as Tc1-Tc5, indicating five different delays on the clock signal generated by the clock generator 930, and as Td1-Td6, indicating six different delays on data signals. As in FIGS. 7-8, if the clock and data signals to a logic block are not synchronized, the data signal must be stored in a register so that it can be accessed by the logic block at the time the logic element is ready to access the data.

Timing constraints thus assist in the placement of the registers 940 and 970A-970B. In the circuit 900, a clock signal is input to the first circuit 910 and data is output from the first circuit 910. Thus, the difference in delay between Tc6 (the time from the clock generator 930 to the register 940 via a path within the embedded FPGA 920) and Td6 (the time from the clock generator 930 to the register 940 via a path through the first circuit 910, including the logic blocks used to generate the data for the register 940) may be substantial. Accordingly, intermediate registers 970A-970B may be used to satisfy the timing constraints.

To determine the timing constraints for the circuit 900, margins are defined. In some example embodiments, the launch clock has a margin of +5% OCV for setup and −5% OCV for hold; the datapath has a margin of +5% ODV for setup and −5% OCV for hold; and the capture clock has a margin of −5% OCV for setup and +5% OCV for hold. Additionally, assumptions are made to allow the calculations to be performed. In some example embodiments, the assumptions are that the path from FF1 (the register 970A) is setup critical for positive-edge launched clock; the path from FF2 (the register 970B) is hold critical for positive-edge launched clock; and each delay has a maximum and minimum value and a rise and fall value.

Using the margins, variables, and delays through the logic blocks, equations are defined that allow solving for the timing constraints.

Positive-edge setup critical timing for data rising through data_in:

1.05($Tc1\_Mr+Tc2\_Mr+Tc3\_Mr+Tc4\_Mr$)+1.05*($Td1\_Mr+Td3\_Mr+Td4\_Mr+Td5\_Mr+Td6\_Mr$)<=0.95*($Tc6\_mr$)+$Tp-Ts$+CRPR1

Positive-edge setup critical timing for data falling through data_in:

1.05($Tc1\_Mr+Tc2\_Mr+Tc3\_Mr+Tc4\_Mr$)+1.05*($Td1\_Mr+Td3\_Mr+Td4\_Mf+Td5\_Mf+Td6\_Mr$)<=0.95*($Tc6\_mr$)+$Tp-Ts$+CRPR2

Positive-edge hold critical timing for data rising through data_in:

0.95*($Tc1\_mr+Tc2\_mr+Tc3\_mr+Tc5\_mr$)+0.95*($Td2\_mr+Td3\_mr+Td4\_mr+Td5\_mr+Td6\_mr$)>=1.05*($Tc6\_Mr$)+$Th$+CRPR3

Positive-edge hold critical timing for data falling through data_in:

$$0.95*(Tc1\_mr+Tc2\_mr+Tc3\_mr+Tc5\_mr)+0.95*$$
$$(Td2\_mr+Td3\_mr+Td4\_mf+Td5\_mf+Td6\_mr)$$
$$>=1.05*(Tc6\_Mr)+Th+CRPR4$$

After solving for the four CRPR values, the clocks and delays are defined:
Clock definitions & delays create_clock CLK -period $Tp$[get_ports clk_out]

create_clock VCLK -period $Tp$ set_clock_latency -source 0.0[get_clocks CLK]

Data delays set_input_delay -clock VCLK -rise -max -add_delay
 [expr 1.05*($Tc2\_Mr+Tc3\_Mr+Tc4\_Mr$)+1.05*
 ($Td1\_Mr+Td3\_Mr+Td4\_Mr$)−CRPR1][get_ports data_in]

set_input_delay -clock VCLK -fall -max -add_delay
 [expr 1.05*($Tc2\_Mr+Tc3\_Mr+Tc4\_Mr$)+1.05*
 ($Td1\_Mr+Td3\_Mr+Td4\_Mf$)−CRPR2][get_ports data_in]

set_input_delay -clock VCLK -rise -min -add_delay
 [expr 0.95*($Tc2\_mr+Tc3\_mr+Tc5\_mr$)+0.95*
 ($Td2\_mr+Td3\_mr+Td4\_mr$)−CRPR3][get_ports data_in]

set_input_delay -clock VCLK -fall -min -add_delay
 [expr 0.95*($Tc2\_mr+Tc3\_mr+Tc5\_mr$)+0.95*
 ($Td2\_mr+Td3\_mr+Td4\_mf$)−CRPR4][get_ports data_in]

Using the defined clocks, the timing checks are performed:
Positive-edge setup critical timing for data rising through data_in:

$$1.05*(Tc1\_Mr)+<\text{clock\_rise\_max\_rise\_input\_delay}$$
$$\text{on data\_in}>+1.05*(Td5\_Mr+Td6\_Mr)<=<\text{min}$$
$$\_\text{rise\_latency on clk\_in}>+0.95*(Tc6\_mr)+Tp-Ts$$

$$=>1.05*(Tc1\_Mr)+1.05*(Tc2\_Mr+Tc3\_Mr+Tc4\_Mr)+$$
$$1.05*(Td1\_Mr+Td3\_Mr+Td4\_Mr)-CRPR1+$$
$$1.05*(Td5\_Mr+Td6\_Mr)<=0.0+0.95*(Tc6\_mr)+$$
$$Tp-Ts$$

Positive-edge setup critical timing for data falling through data_in:

$$1.05*(Tc1\_Mr)+<\text{clock\_rise\_max\_fall\_input\_delay}$$
$$\text{on data\_in}>+1.05*(Td5\_Mf+Td6\_Mr)<=<\text{min}$$
$$\_\text{rise\_latency on clk\_in}>+0.95*(Tc6\_mr)+Tp-Ts$$

$$=>1.05*(Tc1\_Mr)+1.05*(Tc2\_Mr+Tc3\_Mr+Tc4\_Mr)+$$
$$1.05*(Td1\_Mr+Td3\_Mr+Td4\_Mf)-CRPR2+$$
$$1.05*(Td5\_Mf+Td6\_Mr)<=0.0+0.95*(Tc6\_mr)+$$
$$Tp-Ts$$

Positive-edge hold critical timing for data rising through data_in:

$$0.95*(Tc1\_mr)+<\text{clock\_rise\_min\_rise\_input\_delay on}$$
$$\text{data\_in}>+0.95*(Td5\_mr+Td6\_mr)>=<\text{max\_rise-}$$
$$\_\text{latency on clk\_in}>+1.05*(Tc6\_Mr)+Th$$

$$=>0.95*(Tc1\_mr)+0.95*(Tc2\_mr+Tc3\_mr+Tc5\_mr)+$$
$$0.95*(Td2\_mr+Td3\_mr+Td4\_mr)-CRPR3+$$
$$0.95*(Td5\_mr+Td6\_mr)>=0.0+1.05*(Tc6\_Mr)+$$
$$Th$$

Positive-edge hold critical timing for data falling through data_in:

$$0.95*(Tc1\_mr)+<\text{clock\_rise\_min\_fall\_input\_delay on}$$
$$\text{data\_in}>+0.95*(Td5\_mf+Td6\_mr)>=<\text{max\_rise-}$$
$$\_\text{latency on clk\_in}>+1.05*(Tc6\_Mr)+Th$$

$$=>0.95*(Tc1\_mr)+0.95*(Tc2\_mr+Tc3\_mr+Tc5\_mr)+$$
$$0.95*(Td2\_mr+Td3\_mr+Td4\_mf)-CRPR4+0.95*$$
$$(Td5\_mf+Td6\_mr)>=0.0+1.05*(Tc6\_Mr)+Th$$

Figure 10:
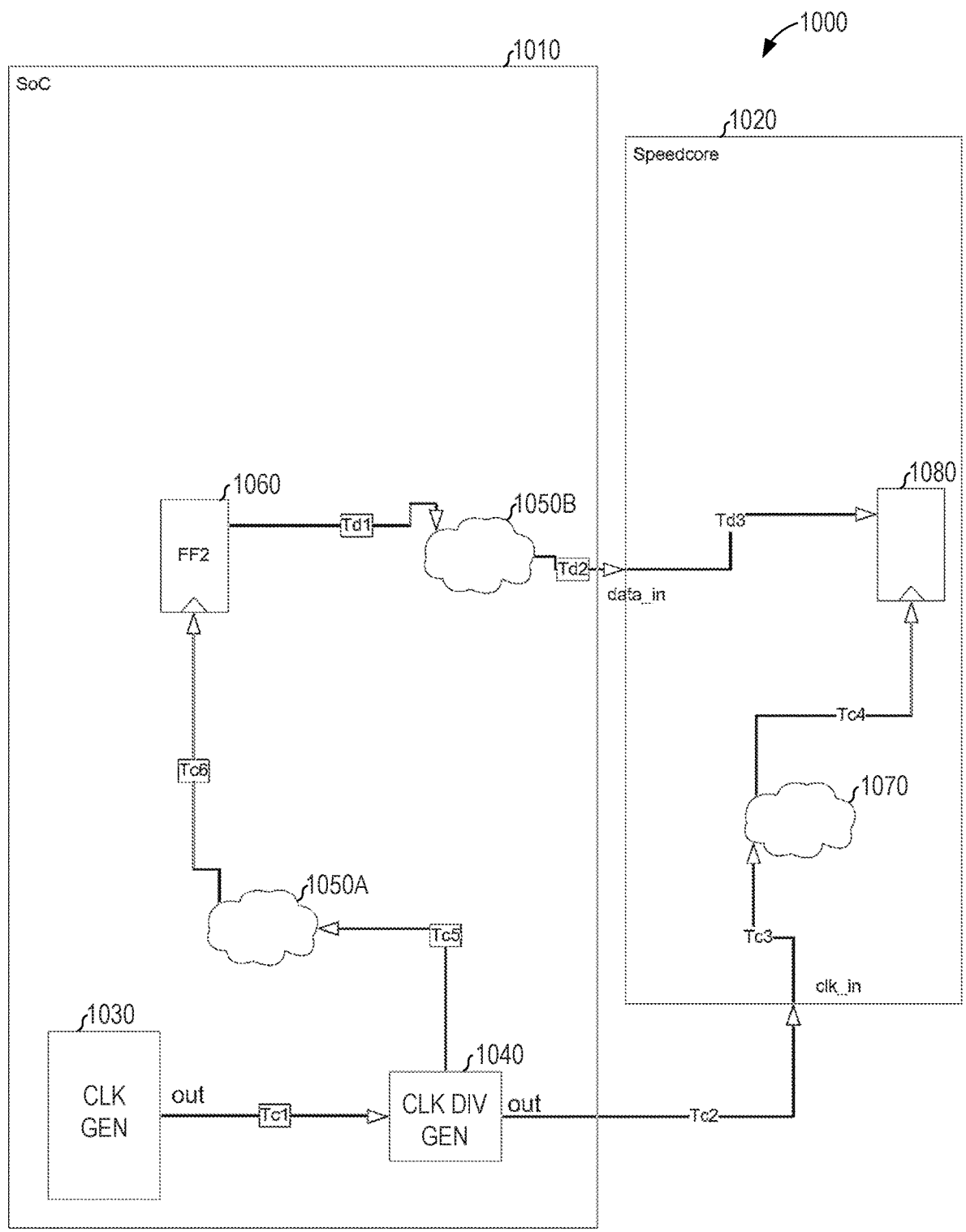
FIG. 10 is a diagrammatic view of a circuit receiving a clock signal and data from an embedded FPGA, according to some example embodiments.

FIG. 10 is a diagrammatic view of a circuit 1000 comprising a first circuit 1010 and an embedded FPGA 1020, the first circuit 1010 providing a clock signal to the embedded FPGA 1020, according to some example embodiments. The first circuit 1010 comprises a clock generator 1030, a divided clock generator 1040, logic blocks 1050A and 1050B, and a register 1060. The embedded FPGA 1020 comprises a logic block 1070 and a register 1080.

The logic blocks 1050A, 1050B, and 1070 may be composed of any number of basic circuit elements. Thus, there is a time lag between the input of a clock or data signal to a logic element and the output from the logic element. This is shown in FIG. 10 as Tc1-Tc4, indicating four different delays on the clock signal generated by the clock generator 1030, and as Td1-Td3, indicating three different delays on data signals. As in FIGS. 7-8, if the clock and data signals to a logic block are not synchronized, the data signal must be stored in a register so that it can be accessed by the logic block at the time the logic element is ready to access the data.

To determine the timing constraints for the circuit 1000, margins are defined. In some example embodiments, the launch clock has a margin of +5% OCV for setup and −5% OCV for hold; the datapath has a margin of +5% ODV for setup and −5% OCV for hold; and the capture clock has a margin of −5% OCV for setup and +5% OCV for hold. Additionally, assumptions are made to allow the calculations to be performed. In some example embodiments, the assumptions are that each delay has a maximum and minimum value and a rise and fall value. Using the margins, variables, and delays through the logic blocks, equations are defined that allow solving for the timing constraints.

Positive-edge setup critical timing for data rising through data_in:

$$1.05(Tc1\_Mr+Tc5\_Mr+Tc6\_Mr)+1.05*(Td1\_Mr+$$
$$Td2\_Mr+Td3\_Mr)<=0.95*(Tc1\_mr+Tc2\_mr+$$
$$Tc3\_mr+Tc4\_mr)+2*Tp-Ts+CRPR1$$

Positive-edge setup critical timing for data falling through data_in:

$$1.05(Tc1\_Mr+Tc5\_Mr+Tc6\_Mr)+1.05*(Td1\_Mr+$$
$$Td2\_Mf+Td3\_Mf)<=0.95*(Tc1\_mr+Tc2\_mr+$$
$$Tc3\_mr+Tc4\_mr)+2*Tp-Ts+CRPR2$$

Positive-edge hold critical timing for data rising through data_in:

$$0.95*(Tc1\_mr+Tc5\_mr+Tc6\_mr)+0.95*(Td1\_mr+$$
$$Td2\_mr+Td3\_mr)>=1.05*(Tc1\_Mr+Tc2\_Mr+$$
$$Tc3\_Mr+Tc4\_Mr)+Th+CRPR3$$

Positive-edge hold critical timing for data falling through data_in:

$$0.95*(Tc1\_mr+Tc5\_mr+Tc6\_mr)+0.95*(Td1\_mr+$$
$$Td2\_mf+Td3\_mf)>=1.05*(Tc1\_Mr+Tc2\_Mr+$$
$$Tc3\_Mr+Tc4\_Mr)+Th+CRPR4$$

After solving for the four CRPR values, the clocks and delays are defined:
Clock definitions & delays create_clock CLKDIV2 -period [expr 2*$Tp$][get_ports clk_in]

create_clock VCLKDIV2 -period [expr 2*$Tp$]

```
set_clock_latency -source -late -rise [expr 1.05*
    (Tc1_Mr+Tc2_Mr)][get_clocks CLKDIV2]

set_clock_latency -source -late -fall [expr 1.05*
    (Tc1_Mf+Tc2_Mf)][get_clocks CLKDIV2]

set_clock_latency -source -early -rise [expr 0.95*
    (Tc1_mr+Tc2_mr)][get_clocks CLKDIV2]

set_clock_latency -source -early -fall [expr 0.95*
    (Tc1_mf+Tc2_mf)][get_clocks CLKDIV2]
```
Data delays
```
    set_input_delay -clock VCLKDIV2 -rise -max
        -add_delay [expr 1.05*(Tc1_Mr+Tc5_Mr+
        Tc6_Mr)+1.05*(Td1_Mr+Td2_Mr)-CRPR1]
        [get_ports data_in]

set_input_delay -clock VCLKDIV2 -fall -max
        -add_delay [expr 1.05*(Tc1_Mr+Tc5_Mr+
        Tc6_Mr)+1.05*(Td1_Mr+Td2_Mf)-CRPR2][get-
        _ports data_in]

set_input_delay -clock VCLKDIV2 -rise -min
        -add_delay [expr 0.95*(Tc1_mr+Tc5_mr+
        Tc6_mr)+0.95*(Td1_mr+Td2_mr)-CRPR3][get-
        _ports data_in]

set_input_delay -clock VCLKDIV2 -fall -min
        -add_delay [expr 0.95*(Tc1_mr+Tc5_mr+
        Tc6_mr)+0.95*(Td1_mr+Td2_mf)-CRPR4][get-
        _ports data_in]
```

Using the defined clocks, the timing checks are performed:
Positive-edge setup critical timing for data rising through data_in:

$$<clock\_rise\_max\_rise\_input\_delay\ on\ data\_in> + 1.05*(Td3\_Mr) <= <min\_rise\_latency\ on\ clk\_in> + 0.95*(Tc3\_mr+Tc4\_mr) + 2*Tp-Ts$$

$$=> 1.05(Tc1\_Mr+Tc5\_Mr+Tc6\_Mr) + 1.05*(Td1\_Mr+Td2\_Mr) - CRPR1 + 1.05*(Td3\_Mr) <= 0.95*(Tc1\_mr+Tc2\_mr) + 0.95*(Tc3\_mr+Tc4\_mr) + 2*Tp-Ts$$

Positive-edge setup critical timing for data falling through data_in:

$$<clock\_rise\_max\_fall\_input\_delay\ on\ data\_in> + 1.05*(Td3\_Mf) <= <min\_rise\_latency\ on\ clk\_in> + 0.95*(Tc3\_mr+Tc4\_mr) + 2*Tp-Ts$$

$$=> 1.05*(Tc1\_Mr+Tc5\_Mr+Tc6\_Mr) + 1.05*(Td1\_Mr+Td2\_Mf) - CRPR2 + 1.05*(Td3\_Mf) <= 0.95*(Tc1\_mr+Tc2\_mr) + 0.95*(Tc3\_mr+Tc4\_mr) + 2*Tp-Ts$$

Positive-edge hold critical timing for data rising through data_in:

$$<clock\_rise\_min\_rise\_input\_delay\ on\ data\_in> + 0.95*(Td3\_mr) >= <max\_rise\_latency\ on\ clk\_in> + 1.05*(Tc3\_Mr+Tc4\_Mr) + Th$$

$$=> 0.95*(Tc1\_mr+Tc5\_mr+Tc6\_mr) + 0.95*(Td1\_mr+Td2\_mr) - CRPR3 + 0.95*(Td3\_mr) >= 1.05*(Tc1\_Mr+Tc2\_Mr) + 1.05*(Tc3\_Mr+Tc4\_Mr) + Th$$

Positive-edge hold critical timing for data falling through data_in:

$$<clock\_rise\_min\_fall\_input\_delay\ on\ data\_in> + 0.95*(Td3\_mf) >= <max\_rise\_latency\ on\ clk\_in> + 1.05*(Tc3\_Mr+Tc4\_Mr) + Th$$

$$=> 0.95*(Tc1\_mr+Tc5\_mr+Tc6\_mr) + 0.95*(Td1\_mr+Td2\_mf) - CRPR4 + 0.95*(Td3\_mf) >= 1.05*(Tc1\_Mr+Tc2Mr) + 1.05*(Tc3\_Mr+Tc4Mr) + Th$$

The Abstract of the Disclosure is provided to comply with 37 C.F.R. § 1.72(b), requiring an abstract that allows the reader to quickly ascertain the nature of the technical disclosure. It is submitted with the understanding that it will not be used to interpret or limit the claims. In addition, in the foregoing Detailed Description, it may be seen that various features are grouped together in a single embodiment for the purpose of streamlining the disclosure. This method of disclosure is not to be interpreted as limiting the claims. Thus, the following claims are hereby incorporated into the Detailed Description, with each claim standing on its own as a separate embodiment.

What is claimed is:

1. A method comprising:
    based on a timing mode, generating boundary conditions from a first circuit design for a first circuit by terminating a timing between the first circuit and a second circuit of a second circuit design at one or more registers within the second circuit, the second circuit being a programmable logic circuit; and
    based on the generated boundary conditions, integrating the first circuit design with the second circuit design into an integrated circuit design.

2. The method of claim 1, further comprising:
    based on the integrated circuit design, fabricating an integrated circuit.

3. The method of claim 1, wherein the programmable logic circuit is a field programmable gate array (FPGA).

4. The method of claim 1, wherein:
    the generating of the boundary conditions comprises performing a timing analysis of the first circuit; and
    the integrating of the first circuit design with the second circuit design comprises determining a location of a register in the second circuit based on the timing analysis of the first circuit.

5. The method of claim 1, wherein the first circuit is fabricated before the integration of the first circuit design with the second circuit design.

6. The method of claim 1, wherein the generated boundary conditions indicate that:
    a clock output from the first circuit is driven through a clock trunk that diverges into an interface cluster register input and a boundary of the first circuit.

7. The method of claim 6, wherein the generating of the boundary conditions comprises determining a negative-edge setup critical timing value for data by applying the set of assumptions for setup analysis.

8. The method of claim 1, wherein the generated boundary conditions indicate that:
    a clock output from the first circuit design is connected to the first circuit and a clock trunk; and
    the clock trunk is connected to the second circuit.

9. The method of claim 8, wherein the generated boundary conditions indicate that:
    the second circuit comprises a first cluster comprising an interface clock that can drive the first cluster with a first skew and can drive a second cluster with a second skew that is greater than the first skew.

10. The method of claim 1, wherein the generating of the boundary conditions comprises applying a set of assumptions for setup analysis comprising a launch clock delay, a data path delay, and a capture clock delay.

11. The method of claim 10, wherein the generating of the boundary conditions comprises determining a positive-edge setup critical timing value for data by applying the set of values assumptions for setup analysis.

12. The method of claim 10, further comprising deriving the launch clock delay, the data path delay, and the capture clock delay from the first circuit design.

13. The method of claim 1, wherein the generating of the boundary conditions comprises applying a set of assumptions for hold analysis comprising a launch clock delay, a data path delay, and a capture clock delay.

14. The method of claim 13, wherein the generating of the boundary conditions comprises determining a positive-edge hold critical timing value for data by applying the set of assumptions for hold analysis.

15. The method of claim 13, wherein the generating of the boundary conditions comprises determining a negative-edge hold critical timing value for data by applying the set of assumptions for hold analysis.

16. A non-transitory machine-readable storage medium containing instructions that, when executed by one or more processors, cause the one or more processors to perform operations comprising:
  based on a timing mode, generating boundary conditions from a first circuit design for a first circuit by terminating a timing between the first circuit and a second circuit of a second circuit design at one or more registers within the second circuit, the second circuit being a programmable logic circuit; and
  based on the generated boundary conditions, integrating the first circuit design with the second circuit design into an integrated circuit design.

17. The storage medium of claim 16, wherein the operations further comprise:
  based on the integrated circuit design, fabricating an integrated circuit.

18. The storage medium of claim 16, wherein the programmable logic circuit is a field programmable gate array (FPGA).

19. The storage medium of claim 16, wherein:
  the generating of the boundary conditions comprises performing a timing analysis of the first circuit; and
  the integrating of the first circuit design with the second circuit design comprises determining a location of a register in the second circuit based on the timing analysis of the first circuit.

20. A system comprising:
  a memory that stores instructions; and
  one or more processors configured by the instructions to perform operations comprising:
  based on a timing mode, generating boundary conditions from a first circuit design for a first circuit by terminating a timing between the first circuit and a second circuit of a second circuit design at one or more registers within the second circuit, the second circuit being a programmable logic circuit; and
  based on the generated boundary conditions, integrating the first circuit design with the second circuit design into an integrated circuit design.

* * * * *